United States Patent
Mori et al.

(10) Patent No.: US 8,355,844 B2
(45) Date of Patent: Jan. 15, 2013

(54) VEHICLE MOTION CONTROL APPARATUS

(75) Inventors: Ryoji Mori, Wako (JP); Yuuji Sakaki, Wako (JP); Noriaki Suzuki, Wako (JP); Teppei Komori, Wako (JP); Hisanori Yanagida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 13/040,410

(22) Filed: Mar. 4, 2011

(65) Prior Publication Data
US 2011/0218700 A1    Sep. 8, 2011

(30) Foreign Application Priority Data

Mar. 5, 2010 (JP) ................................. 2010-049097

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl. ................ 701/48; 701/36; 701/38; 701/71; 701/90; 701/91

(58) Field of Classification Search ................ 701/36, 701/37, 38, 48, 70, 71, 74, 75, 82, 90, 91
See application file for complete search history.

(56) References Cited

U.S. PATENT DOCUMENTS

| 5,765,118 A * | 6/1998 | Fukatani ............... 701/72 |
| 5,839,799 A * | 11/1998 | Fukada ............... 303/146 |
| 2009/0118905 A1 | 5/2009 | Takenaka et al. |

FOREIGN PATENT DOCUMENTS

| EP | 0734939 | 10/1996 |
| JP | 09-099826 | 4/1997 |
| JP | 2003-170822 | 6/2003 |

* cited by examiner

*Primary Examiner* — Hussein Elchanti
*Assistant Examiner* — Rami Khatib
(74) *Attorney, Agent, or Firm* — Rankin, Hill & Clark LLP

(57) ABSTRACT

The vehicle motion control apparatus includes a control unit 37A and sensors 2, 3, 4, 30, 31, 32, 33, etc. The actual state quantity obtaining unit 52 calculates a vehicle body actual slip angle βz_act, etc. The reference dynamic-characteristic model calculating unit 54 calculates a reference vehicle body slip angle βz_d, etc. by using a dynamic characteristic model. The vehicle motion control apparatus also includes a first anti-spin target yaw moment FB unit 68 which calculates a first anti-spin•target yaw moment Mc1_asp based on the vehicle body actual slip angle βz_act and a second anti-spin target yaw moment FB unit 82 which calculates a second anti-spin•target yaw moment Mc2_asp based on a lateral acceleration Gs, a vehicle speed Vact and an actual yaw rate γact.

16 Claims, 7 Drawing Sheets

VEHICLE MOTION CONTROL APPARATUS

CROSS REFERENCE TO RELATED APPLICATION

The application claims the foreign priority benefit under Title 35, United States Code, Section 119(a)-(d) of Japanese Patent Application No. 2010-049097, filed on Mar. 5, 2010, the contents of which are hereby incorporated by reference.

BACKGROUND OF THE INVENTION

1. Field of the Invention

The present invention relates to a vehicle motion control apparatus.

2. Description of the Related Art

JP2003-170822A (see FIG. 6) discloses, for a driving force distribution device that distributes the driving force to the right and left wheels in order to control a vehicle yaw moment, a technology of performing yaw rate feedback control and slip angle feedback control on the driving force distribution amount based on an accelerator open level, an engine rev speed, a vehicle speed, a front-wheel turning angle, a lateral direction acceleration, a yaw rate, and vehicle-body sideslip angle (may also be called a vehicle slip angle), etc.

Also, there are known a control device of controlling respective driving forces of the right and left wheels based on a vehicle slip angle in order to control a yaw moment, and a technology of correcting/controlling the front-wheel turning angle based on a vehicle slip angle.

JPH09-99826A (see FIGS. 2 to 7 and paragraphs from 0077 to 0081) discloses a control device which calculates a target yaw moment from the slip angle of a rear wheel axis and the slip-angle velocity thereof in order to control respective driving forces of the right and left wheels, thereby controlling the yaw moment of a vehicle.

Japan Patent No. 4143111 (see FIGS. 1 and 2) discloses a recent vehicle motion control apparatus which improves the turning characteristic of allowing a vehicle to turn as a driver intends, prevents the vehicle from spinning, and suppresses a false operation and an excessive control. Such a vehicle motion control apparatus includes a feedback distributing/calculating means which compensatingly calculates a virtual external force to be fed back to a motional model of the vehicle based on a deviation between a vehicle first model state quantity (corresponding to a "reference attitude-state quantity" of the present invention) based on the motional model of the vehicle and a vehicle first actual state quantity (corresponding to an "actual attitude-state quantity" of the present invention), and which calculates a yaw moment, etc., to be fed back to the driving amount of an actuator that generates a vehicle motion.

In a vehicle motion control apparatus such as those disclosed in Japanese Patent No. 4143111, however, a vehicle body actual slip angle is used as a first actual state quantity of the vehicle and a reference vehicle body slip angle is used as a first model state quantity of the vehicle, and a feedback control is performed such that the difference between them becomes 0. Therefore, the accuracy of the estimation calculation of the vehicle body actual slip angle directly affects the motion control performance of the vehicle. It is difficult to improve the estimation accuracy of the vehicle body actual slip angle. When the accuracy of the estimation of the vehicle body actual slip angle is seriously decreased, the motion control performance of the vehicle is also decreased, which may give unnatural feeling to a driver.

SUMMARY OF THE INVENTION

The present invention is made in view of the above problem, and an object thereof is to provide a vehicle motion control apparatus whose motion control performance is not deteriorated even when the estimation accuracy of an actual attitude-state quantity of the vehicle, especially, a vehicle body actual slip angle is reduced.

According to a first aspect of the present invention, a vehicle motion control apparatus includes an operated state detecting unit which detects an operated state quantity of a vehicle given by a driver; a motion state detecting unit which detects a motion state quantity of the vehicle, the motion state detecting unit including at least a lateral acceleration sensor which detects a lateral acceleration and a yaw rate sensor which detects an actual yaw rate; a reference attitude-state quantity calculation unit for calculating a reference attitude-state quantity of the vehicle which corresponds to the operated state quantity and the motion state quantity of the vehicle based on a vehicle motion model which is a motion model of the vehicle under a condition in which a predetermined external force is applied to the vehicle; an actual attitude state determining unit which determines an actual attitude-state quantity of the vehicle based on detection signals from the operated state detecting unit and the motion state detecting unit; an attitude-state quantity difference calculation unit which calculates a difference between the reference attitude-state quantity of the vehicle and the actual attitude-state quantity of the vehicle; a virtual external force calculation unit which corrects the external force based on the difference calculated by the attitude-state quantity difference calculation unit and feedbacks the corrected external force to the reference attitude-state quantity calculation unit, and an actuator control unit which determines a control target amount of an actuator generating a vehicle motion, a vehicle slip angle velocity calculation unit which calculates a vehicle slip angle velocity based on the lateral acceleration and the actual yaw rate, wherein the actuator control unit determines the target control amount of the actuator based on at least one of the vehicle slip angle velocity, the actual attitude-state quantity of the vehicle and the difference between the reference attitude-state quantity of the vehicle and the actual attitude-state quantity of the vehicle.

In accordance with the aforementioned vehicle motion control apparatus, the actuator control unit can determine a control target amount of the actuator based on at least one of the vehicle body slip angle velocity, the actual attitude-state quantity of the vehicle and the difference between the reference attitude-state quantity of the vehicle and the actual attitude-state quantity of the vehicle.

The aforementioned vehicle motion control apparatus further includes a target control amount determination control unit which allows a determination of the target control amount of the actuator based on at least one of the actual attitude-state quantity and the vehicle slip angle velocity and prohibits a determination of the target control amount of the actuator based on the other one of the actual attitude-state quantity and the vehicle slip angle velocity, wherein the target control amount determination control unit makes the actuator control unit to determine the target control amount of the actuator based on the at least one of the actual attitude-state quantity and the vehicle slip angle velocity.

In accordance with the aforementioned vehicle motion control apparatus, the control target amount determination control unit allows a determination of the target control amount of the actuator based on at least one of the actual attitude-state quantity and the vehicle slip angle velocity and prohibits a determination of the target control amount of the actuator based on the other one of the actual attitude-state quantity and the vehicle slip angle velocity. As a result, when the accuracy degree of the vehicle body actual slip angle which is the actual attitude-state quantity is determined to be low based on the motion state quantity of the vehicle, the control target amount of the actuator can be controlled based on the vehicle body slip angle velocity calculated from the lateral acceleration and the actual yaw rate. On the other hand, when the accuracy degree of the vehicle body actual slip angle which is the actual attitude-state quantity is determined to be high based on the motion state quantity, the control can be switched such that the control target amount of the actuator is determined based on the actual attitude-state quantity.

For example, if the vehicle is in a rapid braking state or a road friction coefficient is rapidly changed, it is likely that the accuracy of the vehicle body actual slip angle which is the actual attitude-state quantity is decreased. Thus, it is possible to configure to perform the switching control based on the road friction coefficient, the lateral acceleration and the vehicle speed, which are parameters of the motion state quantity, the steering angle, which is a parameter of the operated state quantity of a vehicle, and estimated values of the motion state quantity estimated by using these values.

The aforementioned vehicle motion control apparatus further includes a priority degree selection unit which determines a priority degree between the target control amount of the actuator determined based on the vehicle slip angle velocity and the target control amount of the actuator determined based on the actual attitude-state quantity, wherein the actuator control unit determines the target control amount of the actuator based on the priority degree determined by the priority degree selection unit.

In accordance with the aforementioned vehicle motion control apparatus, the priority degree selection unit determines the priority degree between the control target amount of the actuator determined based on the vehicle body slip angle velocity and the control target amount of the actuator determined based on the actual attitude-state quantity. Thus, it is possible to determine that the control target amount of the actuator having the higher priority degree is weighted greater.

The aforementioned vehicle motion control apparatus further includes an estimation accuracy determination unit which estimates an accuracy degree of the actual attitude-state quantity, wherein the estimation accuracy determination unit increases the priority degree of the target control amount of the actuator determined based on the vehicle slip angle velocity such that the target control amount of the actuator determined based on the vehicle slip angle velocity is increased when the estimation accuracy determination unit determines that the accuracy degree of the actual attitude-state quantity is low.

In accordance with the aforementioned vehicle motion control apparatus, when the estimation accuracy degree determination unit determines that the accuracy degree of the estimation of the actual attitude-state quantity (a vehicle body actual slip angle) of the vehicle performed by the actual attitude state determining unit is low, such as when the road friction coefficient largely contradicts with the lateral acceleration judging from the lateral acceleration output from the lateral acceleration sensor and the road friction coefficient estimated by the road friction coefficient estimation unit, etc. among parameters of the motion state quantity, for example, the weight of the control target amount of the actuator determined based on the vehicle body slip angle is increased and the weight of the control target amount of the actuator determined based on the actual attitude-state quantity is reduced so that the control target amount of the actuator can be determined more based on the vehicle body slip angle. As a result, even when the estimation accuracy of the vehicle body actual slip angle is low, it is possible to stably control the motion of the vehicle.

According to a second aspect of the present invention, a vehicle motion control apparatus includes: an operated state detecting unit which detects an operated state quantity of a vehicle given by a driver; a motion state detecting unit which detects a motion state quantity of the vehicle, the motion state detecting unit including at least a lateral acceleration sensor which detects a lateral acceleration and a yaw rate sensor which detects an actual yaw rate; a reference attitude-state quantity calculation unit which calculates a reference attitude-state quantity corresponding to the operated state quantity of the vehicle and the motion state quantity of the vehicle based on a motion model of the vehicle which is a model for the vehicle under the condition in which an external force is applied to the vehicle; an actual attitude state determining unit which determines an actual attitude-state quantity of the vehicle based on detection signals of the operated state detecting unit and the motion state detecting unit; an attitude-state quantity difference calculation unit which calculates a difference between the reference attitude-state quantity of the vehicle and the actual attitude-state quantity of the vehicle; a virtual external force calculation unit which corrects the external force based on the difference calculated in the attitude-state quantity difference calculation unit and feedbacks the corrected external force to the reference attitude-state quantity calculation unit; an actuator control unit which determines a target control amount of an actuator which generates a vehicle motion; a vehicle slip angle velocity calculation unit which calculates a vehicle slip angle velocity based on the lateral acceleration and the actual yaw rate; a first control target yaw moment calculation unit which determines a first control target yaw moment based on the actual attitude-state quantity of the vehicle; a second control target yaw moment calculation unit which determines a second control target yaw moment based on the vehicle slip angle velocity; wherein a higher value selection unit which compares the first control target yaw moment with the second control target yaw moment and selects a higher value of the first control target yaw moment and the second control target yaw moment, and outputs the selected value to the actuator control unit; and the actuator control unit determines the control target amount of the actuator based on the higher value of the first and the second control target yaw moments selected by the higher value selection unit.

In accordance with the vehicle motion control apparatus according to the second aspect, since the high value selection unit determines the control target amount of the actuator based on the higher value of the first control target yaw moment determined by the first control target yaw moment calculation unit and the second control target yaw moment determined by the second control target yaw moment calculation unit. Thus, even under the condition where the vehicle body actual-slip angle velocity, which is a parameter of the actual attitude-state quantity of the vehicle used for determination of the first control target yaw moment, is estimated to be low, it is possible to prevent the vehicle from spinning in an over steer state by selecting the second control target yaw moment, whereby a stable control of the vehicle motion is realized.

The aforementioned vehicle motion control apparatus according to further includes: a restriction unit which restricts the determined first and the second control target yaw moment when the vehicle slip angle velocity calculated by the vehicle slip angle velocity calculation unit or the actual attitude-state quantity of the vehicle determined by the actual attitude state determining unit is less than or equal to a predetermined value, and outputs the restricted first and the second control target yaw moment to the actuator control unit.

In accordance with the aforementioned vehicle motion control apparatus, when the vehicle body actual slip angle calculated by the vehicle slip angle velocity calculation unit or the actual attitude-state quantity of the vehicle determined by the actual attitude state determining unit is lower than or equal to a predetermined value, the control unit determines that the vehicle is not in an over steer state, restricts the first and the second control target yaw moments and then outputs the restricted first and the second control target yaw moment to the actuator control unit. This enables to prevent an excessive restriction of an over steer.

In the aforementioned vehicle motion control apparatus, the vehicle slip angle velocity calculation unit includes a vehicle body actual slip angle estimation accuracy determination unit which estimates an accuracy degree of a vehicle body actual slip angle in an actual attitude-state quantity, and changes an output value of the vehicle slip angle velocity based on the accuracy degree of the vehicle body actual slip angle determined by the vehicle body actual slip angle estimation accuracy determination unit.

In accordance with the aforementioned vehicle motion control apparatus, since the output of the vehicle body slip angle velocity is varied based on the accuracy degree of the vehicle body actual slip angle determined by the vehicle body actual slip angle estimation accuracy degree determination unit, the output of the vehicle body slip angle velocity can be made larger when the accuracy degree of the vehicle body actual slip angle is low, for example, while the output of the vehicle body slip angle velocity can be made smaller when the accuracy degree of the vehicle body actual slip angle is high. As a result, when the actuator control unit determines the control target amount of the actuator based on at least one of the vehicle body slip angle velocity, the actual attitude-state quantity of the vehicle and the deviation, it is easy to select the higher value or assign the priority degree according to the accuracy degree of the vehicle body actual slip angle.

In accordance with the present invention, a vehicle motion control apparatus is provided whose motion control performance is not deteriorated even when the estimation accuracy of an actual attitude-state quantity of the vehicle, especially, a vehicle body actual slip angle is reduced.

DETAILED DESCRIPTION OF THE PREFERRED EMBODIMENT

An explanation will now be given of an embodiment of the present invention with reference to the accompanying drawings.

Figure 1:
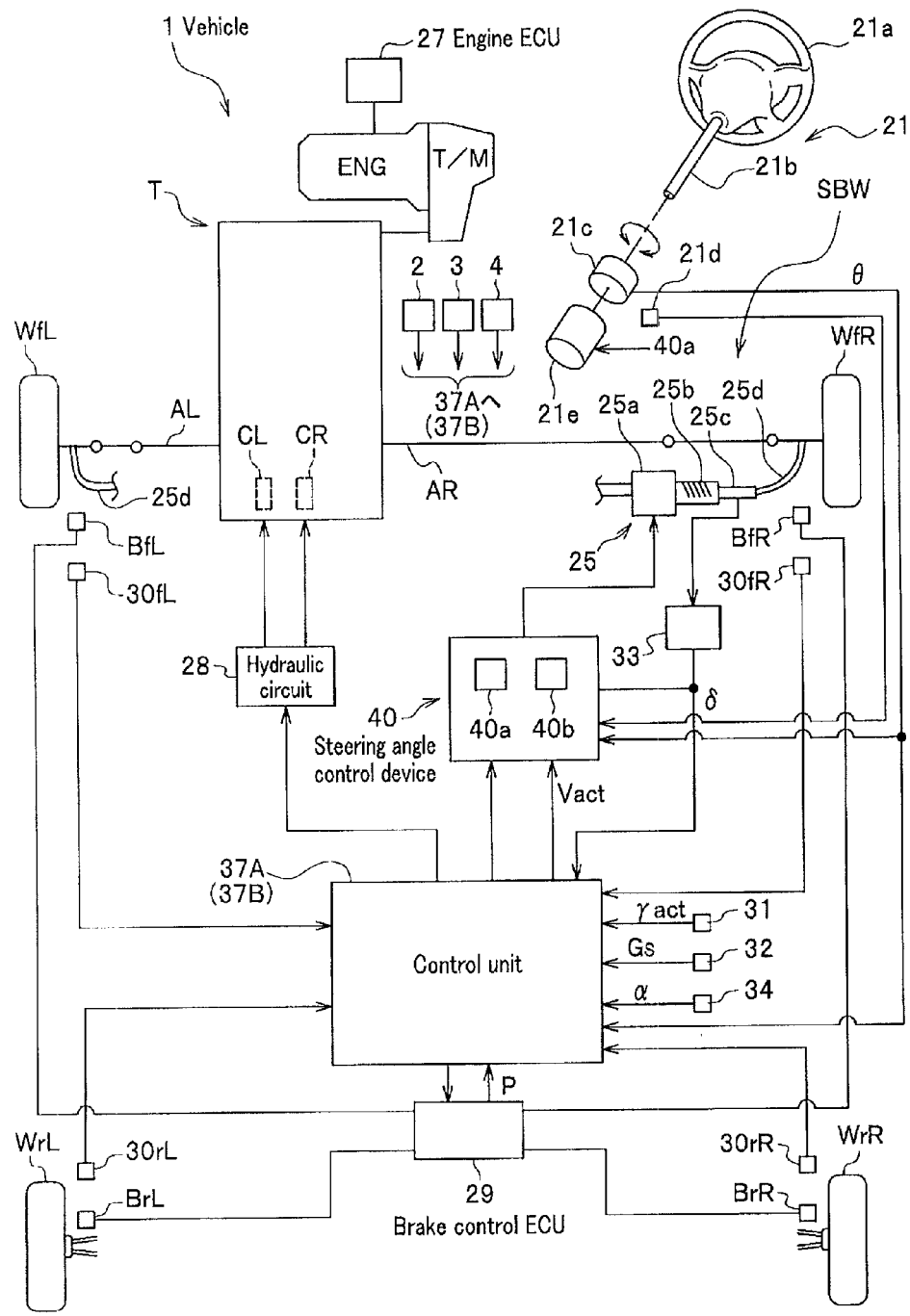
FIG. 1 is an exemplary diagram showing a vehicle including a vehicle motion control apparatus according to a first embodiment of the present invention.
Figure 2:
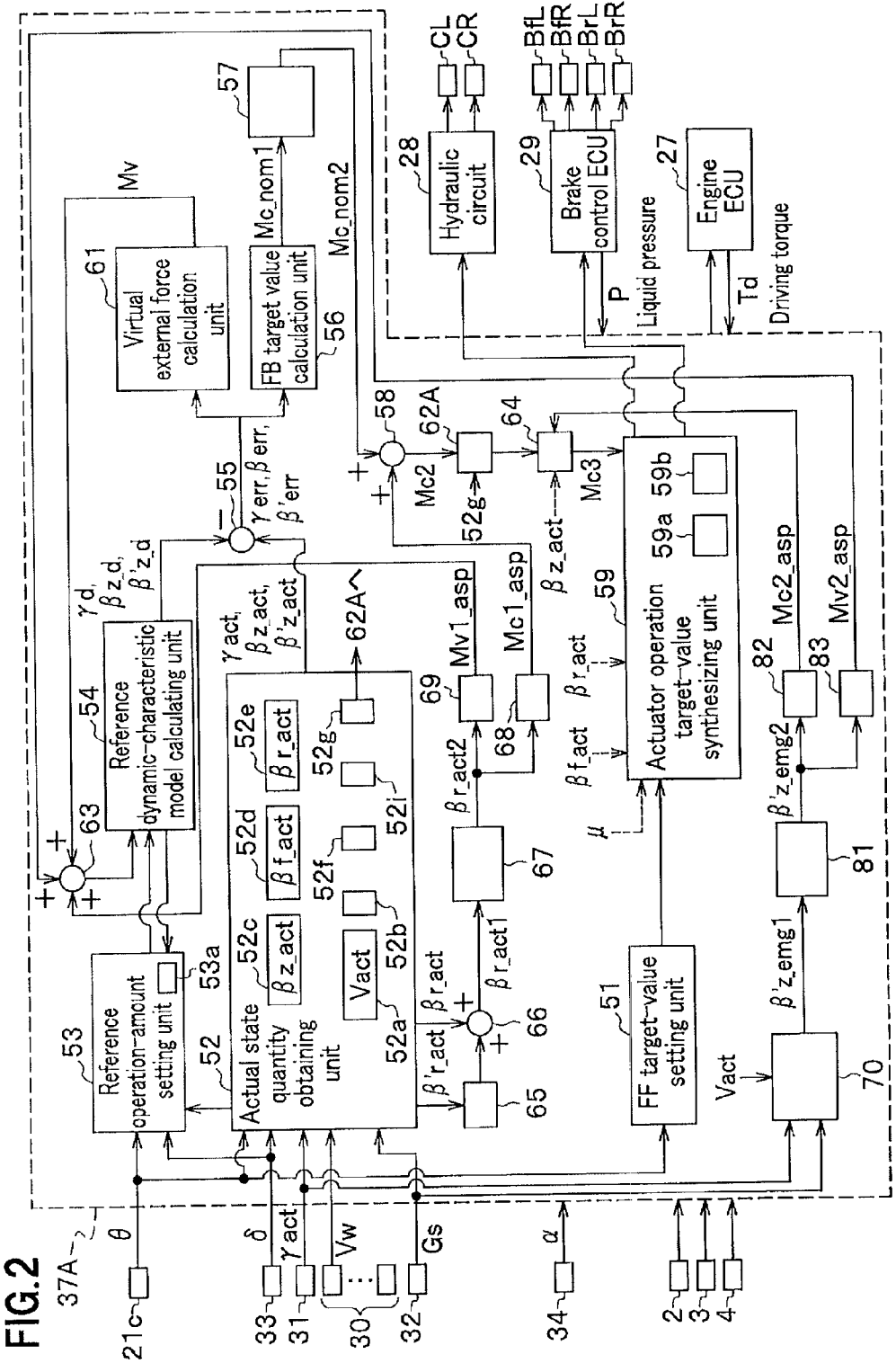
FIG. 2 is a block functional configuration diagram for explaining control logic by the vehicle motion control apparatus according to the first embodiment.

FIG. 1 is an exemplary diagram showing a vehicle including a vehicle motion control apparatus according to a first embodiment. FIG. 2 is a block functional configuration diagram for explaining control logic by the vehicle motion control apparatus according to the first embodiment.

As shown in FIG. 1, a vehicle 1 is a front-wheel drive vehicle, and includes a driving force transmitting device T and a steer-by-wire type front wheel steering device SBW. The vehicle 1 is also provided with a turning angle detecting sensor (an operated state detecting unit) 21c that detects an operation level (an operated state quantity of the vehicle) of a steering handle 21a operated by a driver, a select-lever position sensor (the operated state detecting unit) 2 that detects a selected position (the operated state quantity of the vehicle) of a select lever (unillustrated), an acceleration pedal position sensor (the operated state detecting unit) 3 that detects the press level of an acceleration pedal (unillustrated), and a brake pedal position sensor (the operated state detecting unit) 4 that detects press level of a brake pedal (unillustrated).

Also, the vehicle 1 includes, as a motion control device of the vehicle 1, a control unit (a vehicle motion control apparatus) 37A, a steering angle control device 40 that is a control unit for the front wheel steering device SBW, and various sensors, such as wheel speed sensors 30$f$L, 30$f$R, 30$r$L, and 30$r$R (a motion state detecting unit) that detect respective speeds (a motion state quantity of the vehicle) of wheels WfL, WfR, WrL, and WrR, a yaw-rate sensor (the motion state detecting unit) 31 that detects an actual yaw rate (the motion state quantity of the vehicle) of the vehicle 1, and a lateral acceleration sensor (the motion state detecting unit) that detects a lateral acceleration (the motion state quantity of the vehicle) of the vehicle 1.

The control unit 37A is for a VSA system (Vehicle Stability Assist System), and has various functions, such as an ABS (Antilock Brake System) function of cooperatively operating a brake control ECU (Electric Control Unit) 29, a TCS (Traction Control System) function of cooperatively operating a hydraulic circuit 28 and an engine ECU 27, and an AYC (Active Yaw Control) function of cooperatively operating the hydraulic circuit 28 and a brake control ECU 29.

In this embodiment, an explanation will be given focused on the feature of the AYC function. Hence, in the functional block configuration diagram of the control unit 37A shown in FIG. 2, the functional block of the ABS function and that of the TCS function are omitted.

In order to accomplish the AYC function, the control unit 37A controls the driving force transmitting device T through the hydraulic circuit 28 in order to control a motion at the time of steering, and controls respective brakes BfL, BfR, BrL, and BrR of the wheels W through the brake control ECU (Electric Control Unit) 29 in order to control the motion at the time of steering.

<Drive-Train System>

First, an explanation will be given of the drive-train system of the vehicle 1 including the motion control device of the vehicle 1 of this embodiment. A transmission T/M is joined to the right end of an engine ENG laterally arranged at the front of a vehicle body, and the driving force transmitting device T is arranged behind the engine ENG and the transmission T/M. A left drive shaft AL and a right drive shaft AR extending to the left and the right, respectively, from the left end and the right end of the driving force transmitting device T are linked with the front left wheel WfL and the front right wheel WfR which are driving wheels.

A driving force is input into the driving force transmitting device T through an input shaft extending from the transmission T/M, and comprises, for example, as is disclosed in JP2008-239115 (see FIG. 1), a differential and a double-pinion type epicyclic gear mechanism.

The planetary gear mechanism of the driving force transmitting device T includes a left hydraulic clutch CL and a right hydraulic clutch CR which are controlled by the control unit 37A through the hydraulic circuit 28.

When the vehicle 1 runs straight, the left hydraulic clutch CL and the right hydraulic clutch CR are both in a non-engaged condition. When the vehicle 1 turns right, the hydraulic circuit 28 is controlled by the control unit 37A, the engaging force by the right hydraulic clutch CR is adjusted accordingly, and thus the rotative speed of the front left wheel WfL is increased relative to the front right wheel WfR. When the rotative speed of the front left wheel WfL increases relative to the front right wheel WfR, some of the torque by the front right wheel WfR that is an internal turning wheel can be transmitted to the front left wheel WfL.

On the other hand, when the vehicle 1 turns left, the hydraulic circuit 28 is controlled by the control unit 37A, the engaging force by the left hydraulic clutch CL is adjusted accordingly, and thus the rotative speed of the front right wheel WfR is increased relative to the rotative speed of the front left wheel WfL. When the rotative speed of the front right wheel WfR relative to the front left wheel WfL increases, some of the torque by the front left wheel WfL that is an internal turning wheel can be transmitted to the front right wheel WfR.

<Front Wheel Steering Device>

Next, an explanation will be given of the configuration of the front wheel steering device.

The front wheel steering device SBW realizes a steer-by-wire, and includes an operating unit 21 that is a driving/operating device, a steering unit 25 that is steering device mechanism, and a steering angle control device 40 that controls the steering unit 25.

The operating unit 21 includes a steering wheel 21a operated by the driver, the steering wheel angle θ of the steering wheel 21a is processed by the steering angle control device 40, and a steering motor 25a of the steering unit 25 is driven based on the process result, thereby causing the right and left front wheels WfR, WfL to be steered.

The operating unit 21 includes the steering wheel 21a operated by the driver, a steering shaft 21b that is a rotation shaft of the steering wheel 21a, an steering wheel angle detecting sensor 21c that detects the steering wheel angle θ of the steering wheel 21a, an operating torque sensor 21d, and an operative counterforce motor 21e that improves the operability of the steering wheel 21a. The operating torque sensor 21d is a conventionally well-known sensor, detects an amount of torque input from the steering wheel 21a, and improves the responsiveness of the steering wheel at the time of starting an operation or when the direction of the right and left front wheels WfR, WfL is changed (steering). On the other hand, the steering wheel angle detecting sensor 21c comprises a conventionally well-known sensor that detects a rotative position of the steering shaft 21b by an operation of the steering wheel 21a given by the driver, and outputs the steering wheel angle θ of the steering wheel 21a as a voltage value. The output by the steering wheel angle detecting sensor 21c is used by the steering angle control device 40 to set the turning angle of the right and left front wheels WfR, WfL.

Another end of the steering shaft 21b is joined to the rotation shaft of the operative counterforce motor 21e. The operative counterforce motor 21e receives a signal from the steering angle control device 40, generates a counterforce (an operative counterforce) having a direction different from the operated direction of the steering wheel 21a (the motion of the steering wheel 21a) and having a predetermined magnitude in accordance with a rotative position of the steering wheel 21a and the operated direction thereof, thereby improving the operability of a steering operation and the precision thereof.

Steering of the right and left front wheels WfR, WfL is performed by the steering unit 25 which converts the rotation of the steering motor 25a into a linear motion of a rack shaft 25c through, for example, a ball screw mechanism 25b, and which further converts such a linear motion to a steering motion of the right and left front wheels WfR, WfL through tie rods 25d, 25d.

The position of the rack shaft 25c at the time of liner motion is detected by a turning-angle sensor (the operated state detecting unit) 33 provided at the steering unit 25 as a turning angle δ (the operated state quantity of the vehicle), and is fed back to the steering angle control device 40.

Each wheel WfL, WfR, WrL, and WrR is provided with each wheel speed sensor 30fL, 30fR, 30rL, and 30rR which detects a wheel speed, and such a detected wheel speed is input into the control unit 37A.

A vehicle speed calculating unit (the motion state detecting unit) 52a (see FIG. 2) of the control unit 37A calculates a vehicle speed Vact from the input wheel speeds, and inputs the vehicle speed Vact to the steering angle control device 40.

Each wheel WfL, WfR, WrL, and WrR is provided with each brake BfL, BfR, BrL, and BrR which is controlled by the brake control ECU 29.

The left hydraulic clutch CL, the right hydraulic clutch CR, and the brakes BfL, BfR, BrL, and BrR may also be referred to as an "actuator".

<Turning Angle Device>

The steering angle control device 40 comprises an ECU (Electronic Control Unit) including a CPU (Central Processing Unit), a ROM (Read Only Memory), a RAM (Random Access Memory), and predetermined electric circuits, and as shown in FIG. 1, is electrically coupled to the operating unit 21 and the steering unit 25 through signal transmitting cables.

The steering angle control device 40 receives detection signals from the turning-angle detecting sensor 21c of the operating unit 21 and the operating torque sensor 21d thereof, and a signal indicating the vehicle speed Vact from the vehicle speed calculating unit 52a (see FIG. 2), and sets a front wheel target turning angle at which the front wheels WfL, WfR are directed in a desired direction. Also, the steering angle control device 40 includes a target turning angle setting/operating counterforce control unit 40a that controls the operative counterforce motor 21e of the operating unit 21, and a steering motor control unit 40b that drives the steering motor 25a.

The steering angle control device 40 has the same configuration as one shown in FIG. 2 of JP2004-224238A.

<Functional Block Configuration of Vehicle Motion Control Apparatus>

Next, an explanation will be given of the functional block configuration of the control unit 37A which causes the driving force transmitting device T to control a driving torque to each of the right and left front wheels WfR, WfL through the hydraulic circuit 28, and which controls a braking force to each wheel WfL, WfR, WrL, and WrR through the brake control ECU 29, thereby controlling a yaw moment around the weighted center of the vehicle 1 with reference to FIG. 2 and FIG. 1 as needed.

The control unit 37A comprises an ECU including a CPU, a ROM, a RAM, and predetermined electric circuits. As shown in FIG. 1, the control unit 37A is electrically coupled to the steering angle control device 40 through signal transmitting cables (omitted in FIG. 2). Also, as shown in FIG. 1, the control unit 37A is electrically coupled to the hydraulic circuit 28 and the brake control ECU 29 through signal transmitting cables, and also coupled to the engine ECU 27 through a communication line which is not illustrated in the figure. The engine ECU 27 inputs signals indicating a driving torque to each front wheel WfL, WfR that are driving wheels, a selected position of the select lever, and an acceleration pedal position to the control unit 37A. The brake control ECU 29 inputs each liquid pressure PfL, PfR, PrL, and PrR of each brake (in FIG. 2, a single liquid pressure P comprehensively represents those) to the control unit 37A.

The engine ECU 27 also has a function of controlling the reduction ratio of the transmission T/M.

The control unit 37A includes, as functional blocks, a feed forward target value setting unit 51 (hereinafter, referred to as "a FF target value setting unit 51"), an actual state quantity obtaining unit (a motion state detecting unit, an actual attitude state determining unit) 52, a reference operation-amount setting unit 53, a reference dynamic-characteristic model calculating unit (a reference attitude-state quantity calculation unit) 54, a difference calculation unit (an attitude-state quantity difference calculation unit) 55, a feedback target value calculating unit (a first control target yaw moment calculation unit) 56 (hereinafter, referred to as "a FB target value calculation unit 56"), a feedback dead zone processing unit 57, an adder 58, an actuator operation target-value synthesizing unit (a virtual external force calculation control unit) 59, a virtual external force calculation unit 61, a feedback target value output control unit (hereinafter, referred to as "a FB target value output control unit 62A"), an adder 63, a high value selection unit 64, a rear wheel actual slip angle correction unit 65, an adder 66, a rear wheel slip angle dead zone processing unit 67, a first anti-spin target yaw moment feedback calculation unit (first control target yaw moment calculation unit) 68 (hereinafter, referred to as "first anti-spin target yaw moment FB unit 68"), a first anti-spin/virtual yaw moment feedback calculation unit 69 (hereinafter, referred to as "a first anti-spin/virtual yaw-moment FB unit 69"), a second vehicle body actual-slip angle velocity calculation unit (a vehicle slip angle velocity calculation unit) 70, a second vehicle body actual-slip angle velocity dead zone processing unit 81, a second anti-spin target yaw moment FB unit (a second control target yaw moment calculation unit) 82, and the second anti-spin/virtual yaw moment FB unit 83.

The CPU of the control unit 37A performs processing of the above-described functional blocks. The above-described functional blocks of the control unit 37A are described in detail below.

<FF Target Value Setting Unit>

The FF target value setting unit 51 reads drive/operation inputs (the operated state quantity of the vehicle), such as the steering wheel angle θ of the steering wheel 21a, the selected position of the select lever, the press amount of the acceleration pedal, and the press amount of the brake pedal, and the vehicle speed Vact calculated by the vehicle speed calculating unit 52a of the actual-state-quantity obtaining unit 52, and sets each FF target value of each brake BfL, BfR, BrL, and BrR, each of the right and left hydraulic clutches CL, CR, and the reduction ratio of the transmission, etc.

The FF target value setting unit 51 sets, as is disclosed in Japan Patent No. 4143111, paragraphs from 0372 to 0377, and FIG. 17, FF target values of braking forces to the wheels WfL, WfR, WrL, and WrR, and FF target values of driving forces to the right and left front wheels WfR, and WfL. More specifically, as FF target values, an FF target first wheel brake driving/braking force by the brake BfL, an FF target second wheel brake driving/braking force by the brake BfR, an FF target third wheel brake driving/braking force by the brake BrL, and an FF target fourth wheel brake driving/braking force by the brake BrR are calculated and set to the wheels, WfL, WfR, WrL, and WrR, respectively.

Also, as the FF target values, an FF target first wheel driving system driving/braking force by the left hydraulic clutch CL and an FF target second wheel driving system driving/braking force by the right hydraulic clutch CR may be calculated and set to the wheels WfL, WfR, respectively. Furthermore, as the FF target value, an FF target mission reduction ratio may be calculated and set to the transmission T/M.

<Actual-State-Quantity Obtaining Unit>

Next, the actual-state-quantity obtaining unit 52 obtains selected position signal from a select-lever position sensor 2, a signal indicating a press amount from an acceleration pedal position sensor 3, a signal indicating a press amount from a brake pedal position sensor 4, a signal indicating the steering wheel angle θ of the steering wheel 21a from the steering wheel angle detecting sensor 21c, a signal indicating an actual yaw rate γact of the vehicle 1 from a yaw-rate sensor 31, a signal indicating a lateral direction acceleration Gs of the vehicle 1 from a lateral-direction acceleration sensor 32, a signal indicating a longitudinal direction acceleration α, a signal indicating the wheel speed Vw from each of the four wheel speed sensors 30 (in this embodiment, 30fL, 30fR, 30rL, and 30rR as shown in FIG. 1), and a signal indicating the turning angle δ from the turning-angle sensor 33, etc.

The actual-state-quantity obtaining unit 52 includes, as functional blocks, the vehicle speed calculating unit (the motion state detecting unit) 52a, a friction coefficient estimating/calculating unit (the motion state detecting unit, the road friction coefficient estimation unit) 52b, a vehicle-body actual-slip-angle calculating unit (the actual attitude state determining unit) 52c, a front-wheel actual-slip-angle calculating unit (the actual attitude state determining unit) 52d, a rear-wheel actual-slip-angle calculating unit (the actual attitude state determining unit) 52e, an actual-slip-angle velocity calculating unit (the actual attitude state determining unit) 52f, an actual-state-quantity determining unit (the virtual-external-force-calculation controlling unit, and a detected abreferenceity determining unit) 52g, an alternative value calculating unit (the actual attitude state determining unit, and an alternative value calculating unit) 52h, a tire characteristic setting unit (the actual attitude state determining unit) 52i, and a bank angle estimating/calculating unit (an inclination determining unit) 52k.

The actual-state-quantity obtaining unit 52 further includes a yaw rate midpoint learning/correcting unit that is a functional block which obtains a detected signal from the yaw-rate sensor 31, performs midpoint learning, and outputs the actual yaw rate γact corrected with a condition in which no right and left yaw rate is generated being as a zero point to the other functional blocks in the actual-state-quantity obtaining unit 52, and a turning angle midpoint learning/correcting unit that is a functional block which obtains a detected signal from the turning-angle sensor 33, performs midpoint learning, and outputs the turning angle δ corrected with a neutral condition (the condition in which the vehicle 1 travels straight) being as a zero point to the other functional blocks in the actual-state-quantity obtaining unit 52. However, such functional blocks are omitted in FIG. 2.

The actual yaw rate γact corrected by the midpoint learning is input into the difference calculating unit 55.

<Vehicle Speed Calculating Unit>

The vehicle speed calculating unit 52a calculates the vehicle speed Vact (the motion state quantity of the vehicle) based on each wheel speed Vw from each wheel speed sensor 30 through a conventionally well-known scheme as is disclosed in, for example, JP2000-85558A. In particular, when the brake pedal is not operated, the average value of respective wheel speeds Vw indicated by the wheel speed sensors 30rL, 30rR of the rear wheels WrL, WrR which are the follower wheels is the vehicle speed Vact. The vehicle speed calculating unit 52a also calculates the slip ratio of each wheel W based on each wheel speed Vw and the vehicle speed Vact from each wheel speed sensor 30.

In this embodiment, the present invention is not limited to a scheme of calculating the vehicle speed Vact from the wheel speed sensors 30fL, 30fR, 30rL, and 30rR, and the vehicle 1 may have a conventionally well-known vehicle speed sensor which directly detects a ground speed independently from the wheel speed sensors 30fL, 30fR, 30rL, and 30rR, and the actual-state-quantity obtaining unit 52 may obtain a signal indicating the vehicle speed Vact from the vehicle speed sensor.

<Friction Coefficient Estimating/Calculating Unit>

The friction coefficient estimating/calculating unit 52b estimates and calculates a road friction coefficient μ that is a parameter of the motion state quantity of the vehicle based on the lateral direction acceleration Gs, the actual yaw rate γact, the tire characteristics (a wheel actual slip angle/cornering force characteristic, a wheel-W slip ratio/cornering force reduction rate characteristic, a wheel-W slip ratio/braking-and-driving characteristic) for each wheel W from the tire characteristic setting unit 52i, the wheel slip ratio, a slip angle βf_act of the front wheels WfL, WfR calculated by the front-wheel actual-slip-angle calculating unit 52d, and a slip angle βr_act of the rear wheels WrL, WrR calculated by the rear-wheel actual-slip-angle calculating unit 52e, etc., through the conventionally well-known scheme disclosed in, for example, JP2000-85558A.

Figure 3:
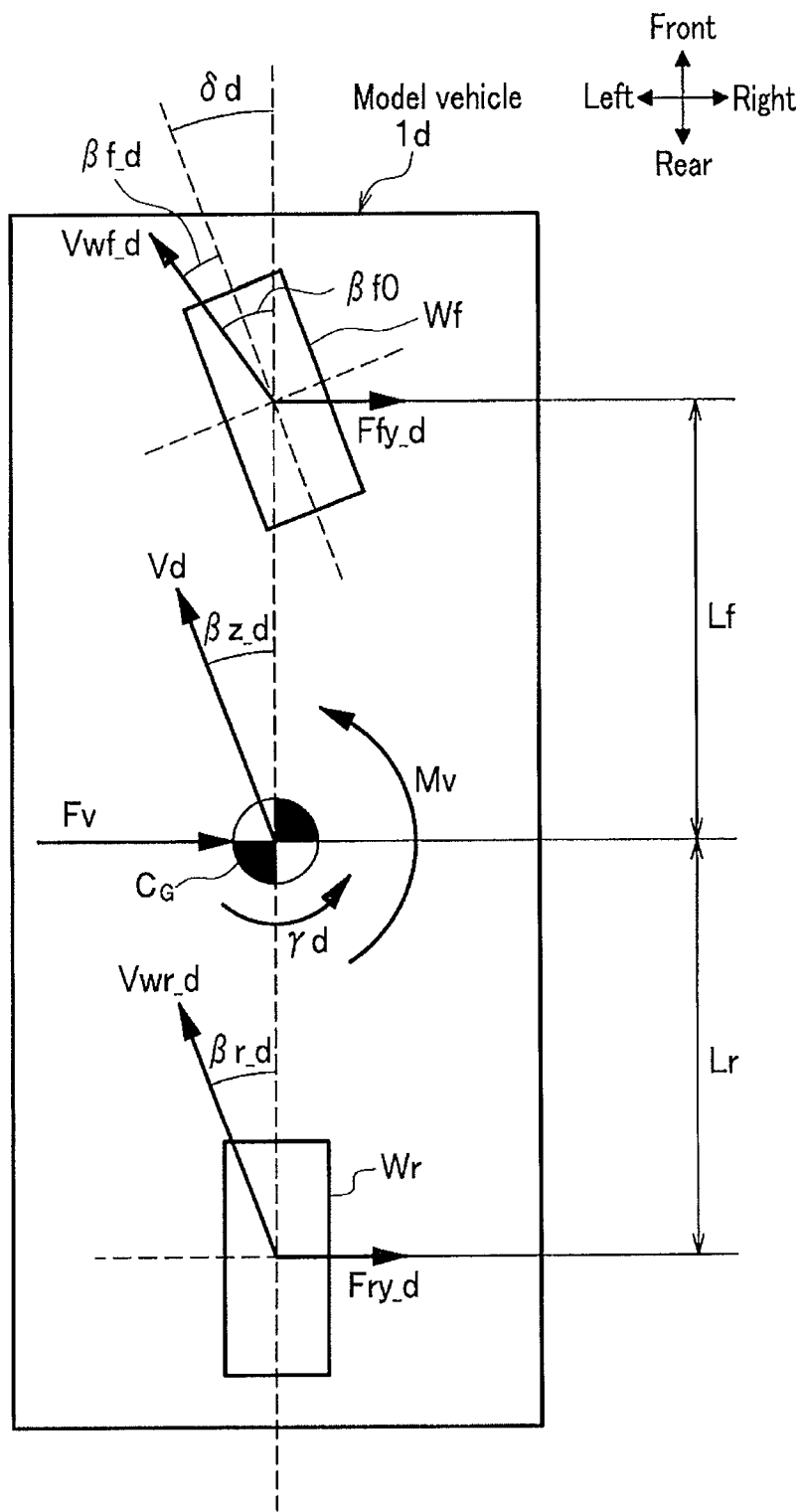
FIG. 3 is an explanatory diagram for reference symbols on a model vehicle considered over a vehicle dynamic-characteristic model.

The tire characteristic setting unit 52i corresponds to the tire characteristic setting means 12 disclosed in JP2000-85558A, paragraph 0013 and FIG. 3.

As is disclosed in JP2007-145075A, paragraphs from 0029 to 0032, the friction coefficient estimating/calculating unit 52b may calculate the braking force to each wheel W based on each liquid pressure P of each of the brakes BfL, BfR, BrL, and BrR of each wheel W, and may estimate and calculate the road friction coefficient μ based on the braking force of each wheel W, the angular speed of each wheel W, the radius of each wheel W, the moment of inertia of each wheel W, and the grounded load of each wheel W.

<Vehicle-Body Actual-Slip-Angle Calculating Unit>

The vehicle-body actual-slip-angle calculating unit 52c estimates and calculates a vehicle-body actual slip angle (the actual attitude-state quantity of the vehicle) β_act based on the turning angle δ, the actual yaw rate γact, the lateral direction acceleration Gs, the vehicle speed Vact, and the slip ratio of each wheel W, etc., through a conventionally well-known scheme disclosed in, for example, JP2000-85558A. As shown in FIG. 3, the vehicle-body actual slip angle β_act is a vehicle-body slip angle around the weighted center of the vehicle 1, and is often called a vehicle-body slip angle. In order to distinguish the vehicle-body slip angle from a vehicle-body reference slip angle β_d that is a vehicle-body slip angle around the weighted center calculated by the reference dynamic-characteristic model calculating unit 54, the former vehicle-body slip angle is referred to as the vehicle-body slip angle β_act.

The vehicle-body slip angle β_act estimated and calculated by the vehicle-body actual-slip-angle calculating unit 52c is input into the difference calculating unit 55.

<Front-Wheel Actual-Slip-Angle Calculating Unit>

The front-wheel actual-slip-angle calculating unit 52d calculates an actual slip angle βf_act (hereinafter, simply referred to as a "front-wheel actual slip angle (the attitude-state quantity of the vehicle) βf_act") of the front wheels WfL, WfR based on the vehicle-body actual slip angle βz_act, the actual yaw rate γact, the vehicle speed Vact, and the turning angle δ through a conventionally well-known scheme. Also, the rear-wheel actual-slip-angle calculating unit 52e calculates an actual slip angle βr_act (hereinafter, simply referred to as a "rear-wheel actual slip angle (the attitude-state quantity of the vehicle) βr_act") of the rear wheels WrL, WrR, based on the vehicle-body actual slip angle βz_act, the actual yaw rate γact, and the vehicle speed Vact through a conventionally well-known scheme.

For example, the front-wheel actual slip angle βf_act can be calculated through a following formula (1), and the rear-wheel actual slip angle βr_act can be calculated through a following formula (2).

$$\beta f\_act = \beta z\_act + Lf \cdot \gamma act / Vact - \delta \quad (1)$$

$$\beta r\_act = \beta z\_act - Lr \cdot \gamma act / Vact \quad (2)$$

where Lf is a distance between the weighted center of the vehicle 1 and respective drive shafts AL, Ar of the front wheels WfL, WfR in the back-and-forth direction, and Lr is a distance between the weighted center of the vehicle 1 and respective rotational axes of the rear wheels WrL, WrR in the back-and-forth direction (see FIG. 3).

The front-wheel actual slip angle βf_act calculated by the front-wheel actual-slip-angle calculating unit 52d is input into the actuator operation target-value synthesizing unit 59.

The rear-wheel actual slip angle βr_act calculated by the rear-wheel actual-slip-angle calculating unit 52e is input into the adder 66 and the actuator operation target-value synthesizing unit 59.

<Actual-Slip-Angle Velocity Calculating Unit>

The actual-slip-angle velocity calculating unit 52f performs time differentiation based on the last vehicle-body actual slip angle βz_act periodically calculated by the vehicle-body actual-slip-angle calculating unit 52c and the current vehicle-body actual slip angle βz_act in order to calculate a first vehicle-body actual-slip-angle velocity (the actual attitude-state quantity of the vehicle) β'z_act. The vehicle-body actual-slip-angle velocity β'z_act calculated by the actual-slip-angle velocity calculating unit 52f is input into the difference calculating unit 55. The actual-slip-angle velocity calculating unit 52f is the first vehicle body slip-angle velocity calculation unit in that the actual-slip-angle velocity calculating unit 52f calculates the first vehicle body actual slip-angle velocity β'z_act. Hereinafter, the first vehicle body actual slip-angle velocity β'z_act is just referred to as "the vehicle body slip-angle-velocity β'z_act".

Also, the actual-slip-angle velocity calculating unit 52f performs time differentiation based on the last rear-wheel actual slip angle βr_act periodically calculated by the rear-wheel actual-slip-angle calculating unit 52d and the current rear-wheel actual slip angle βr_act in order to calculate a rear-wheel actual-slip-angle velocity (the actual attitude-state quantity of the vehicle) β'r_act. The rear-wheel actual-slip-angle velocity β'r_act calculated by the actual-slip-angle velocity calculating unit 52f is input into the rear-wheel actual-slip-angle correcting unit 65.

<Estimation Accuracy Determination Unit>

The estimation accuracy determination unit 52g monitors signals from the aforementioned various types of sensors, the select bar position sensor 2, the accelerator pedal position sensor 3, the brake pedal position sensor 4, the wheel speed sensors 30fL, 30fR, 30rL, 30rR, the yaw rate sensor 31, the lateral acceleration sensor 32, the steering angle sensor 33 and the longitudinal direction acceleration sensor 34. When the friction coefficient μ estimated by the friction coefficient estimating/calculating unit 52b is large even though the lateral acceleration is low or the friction coefficient μ is large even though the slip ratio is large under the condition where the steering angle is more than or equal to a predetermined value, for example, an error of the output of the friction coefficient estimating/calculating unit 52b to the actual road friction coefficient may be large.

When the estimation accuracy determination unit 52g determines that the difference between the lateral acceleration $Gs\_est = Kc \times \mu$ (Kc is a gain determined by the specification of the vehicle 1) which is estimated by the road friction coefficient μ estimated by the friction coefficient estimating/calculating unit 52b, the steering angle δ and the vehicle speed Vact and the lateral acceleration Gs from the lateral acceleration sensor 32 is more than or equal to a predetermined value, the actual road friction coefficient may be lower than the estimated road friction coefficient μ.

When the estimation accuracy determination unit 52g determines that the difference is more than or equal to the predetermined value as described above, the estimation accuracy determination unit 52g outputs to the FB target value output control unit 62A an accuracy degree determination signal indicating that the estimation accuracy of the actual attitude-state quantity is low or not available.

Although not shown, whether or not the error of the output value of the friction coefficient estimating/calculating unit 52b is large may be determined based on the slip ratio of each wheels W calculated by the vehicle speed calculation unit 52a, the reference attitude-state quantity calculated by the reference dynamic-characteristic model calculating unit 54, the actual attitude-state quantity of the vehicle and the difference calculated by the difference calculation unit 55.

<Reference Operation-Amount Setting Unit>

The reference operation-amount setting unit 53 sets a reference model operation amount that is an input to the above-explained reference dynamic-characteristic model calculating unit 54. According to this embodiment, the reference operation-amount setting unit 53 sets a turning angle (hereinafter, a model turning angle δd) of the front wheels WfL, WfR of the vehicle 1. In order to set the model turning angle δd, the steering wheel angle θ (a present value) of the steering wheel 21a (see FIG. 1) is input as a main input quantity to the reference operation-amount setting unit 53, and the vehicle speed Vact (a present value) and the estimated friction coefficient μ (a present value) both calculated by the actual-state-quantity obtaining unit 52 and the state quantity (a previous value) of the vehicle 1 used in the reference dynamic-characteristic model calculating unit 54 are also input into the reference operation-amount setting unit 53. Hence, the reference operation-amount setting unit 53 includes a previous-state-quantity memory unit 53a that temporarily stores the state quantity of the vehicle 1 which is used in the reference dynamic-characteristic model calculating unit 54.

The reference operation-amount setting unit 53 sets the model turning angle δd based on those inputs. It is basically appropriate if the model turning angle δd is set in accordance with the steering wheel angle θ. However, according to this embodiment, a predetermined restriction is given to the model turning angle δd input into the reference dynamic-characteristic model calculating unit 54. In order to establish such a restriction, in addition to the steering wheel angle θ, the vehicle speed Vact, the estimated road friction coefficient μ, etc., are also input into the reference operation-amount setting unit 53.

The reference operation-amount setting unit 53 corresponds to the "reference operation-amount setting unit 14" disclosed in Japan Patent No. 4143111, paragraphs from 0127 to 0129, etc.

<Reference Dynamic-Characteristic Model Calculating Unit>

Next, an explanation will be given of the reference dynamic-characteristic model calculating unit 54 with reference to FIGS. 2 and 3. FIG. 3 is an explanatory diagram for reference symbols on a model vehicle 1d considered over a dynamic-characteristic model of the vehicle 1.

The reference dynamic-characteristic model calculating unit 54 sets and outputs a reference attitude-state quantity that is a state quantity of a reference motion of the vehicle 1 based on a vehicle dynamic-characteristic model defined beforehand. The vehicle dynamic-characteristic model represents a dynamic characteristic of the vehicle 1, and a reference attitude-state quantity is sequentially calculated based on predetermined inputs including the above-explained reference model operation amount. The reference motion of the vehicle 1 is basically an ideal motion of the vehicle 1 or a motion similar thereto which can be appropriate to the driver.

The reference dynamic-characteristic model calculating unit 54 to which a result of adding the reference model operation amount set by the reference operation-amount setting unit 53, a virtual external force yaw moment Mv that is a feedback control input calculated by the virtual external-force calculating unit 61, a first anti-spin/virtual FB yaw moment Mv1_asp calculated by the first anti-spin/virtual yaw-moment FB unit 69 and a second anti-spin/virtual FB yaw moment Mv2_asp calculated by the second anti-spin/virtual yaw-moment FB unit 69 is input calculates the reference attitude-state quantity, more specifically, the reference yaw rate γd, a vehicle-body reference slip angle βz_d, etc., in chronological order based on those inputs through a repeated computation including integration.

The reference yaw rate γd is a reference attitude-state quantity relating to the rotational motion of a model vehicle 1d (see FIG. 3) around a weighted center $C_G$ (see FIG. 3) in the yaw direction used for the reference dynamic-characteristic model. The vehicle-body reference slip angle βz_d is a reference attitude-state quantity relating to a vehicle-body slip angle that is an angle defined by the back-and-forth axis of the model vehicle 1d relative to the direction of the vehicle speed Vd at the weighted center $C_G$ of the model vehicle 1d. In order to sequentially calculating those reference attitude-state quantities γd, and βz_d for each control process period, a result of adding the model turning angle (a present value) which is the reference model operation amount, the feedback control input (the virtual external force yaw moment) Mv (a previous value), the first anti-spin/virtual FB yaw moment Mv1_asp (a previous amount) and the second anti-spin/virtual FB yaw moment Mv2_asp is input to the reference dynamic-characteristic model calculating unit 54. In this case, according to this embodiment, the vehicle speed Vd of the model vehicle 1d used in the reference dynamic-characteristic model calculating unit 54 is caused to match the actual vehicle speed Vact. In order to do so, the vehicle speed Vact (a present value) calculated by the actual-state-quantity obtaining unit 52 is also input into the reference dynamic-characteristic model calculating unit 54 through the reference operation-amount setting unit 53. The reference dynamic-characteristic model calculating unit 54 calculates the reference yaw rate γd, the vehicle-body reference slip angle βz_d, and the vehicle-body reference-slip-angle velocity β'z_d of the model vehicle 1d on the reference dynamic characteristic model based on those inputs, and outputs the calculated results to the difference calculating unit 55.

A feedback input Mv subjected to feedback-control input from the virtual external-force calculating unit 61 to the reference dynamic-characteristic model calculating unit 54 is a feedback-control input which is additionally input to the reference dynamic-characteristic model in order to prevent the reference motion of the model vehicle id from being out of (differing from) the motion of the vehicle 1 (in order to approximate the reference motion to the motion of the vehicle 1) originating from a change in the running environment (e.g., a road condition) of the vehicle 1 (a change that is not considered in the reference dynamic-characteristic model), a modeling error by the reference dynamic-characteristic model, or the detection error by each sensor, an estimation/calculation error by the actual-state-quantity obtaining unit 52, etc. The feedback input Mv is a virtual external force virtually acting on the model vehicle 1d over the reference dynamic-characteristic model according to this embodiment. Also, the feedback input Mv is a virtual moment in the yaw direction which acts on the model vehicle 1d over the reference dynamic-characteristic model around the weighted center $C_G$. Hereinafter, this feedback input is referred to as a "virtual external-force yaw moment Mv".

<Reference Dynamic-Characteristic Model>

The reference dynamic-characteristic model of this embodiment will be briefly explained with reference to FIG. 3. FIG. 3 is an explanatory diagram for the model vehicle used in the reference dynamic-characteristic model according to this embodiment. The model vehicle 1d (a so-called two-wheel model) represents the dynamic characteristic of the vehicle 1 through the dynamic characteristic (dynamics-based characteristic) of the vehicle 1 having a front wheel Wf and a rear wheel Wr on a plane. The front wheel Wf of the model vehicle 1d corresponds to a wheel Wf that combines the two actual front wheels WfL, WfR of the vehicle 1, and is a wheel of the model vehicle 1d to be steered. The rear wheel Wr corresponds to a wheel W that combines the two actual rear wheels WrL, WrR of the vehicle 1, and is a wheel not to be steered according to this embodiment.

The model vehicle 1d is conventionally well-known, and reference symbols not explained above will be explained below, and the detailed explanation will be omitted.

δd represents the turning angle, and is a reference model operation amount input into the reference dynamic-characteristic model. Vf_d is a travelling speed vector of the front wheel Wf of the model vehicle 1d on a plane, Vr_d is a travelling speed vector of the rear wheel Wr of the model vehicle 1d on a plane, and βf_d is a slip angle (hereinafter, referred to as a "front-wheel slip angle (βf_d") of the front wheel Wf. βr_d is a slip angle (hereinafter, referred to as a "rear-wheel slip angle βr_d") of the rear wheel Wr. βf0 is an angle (hereinafter, referred to as a "vehicle front-wheel-position slip angle βf0") that is an angle of the travelling speed vector Vwf_d of the front wheel Wf of the model vehicle 1d relative to the back-and-forth axis of the model vehicle 1d.

More specifically, the dynamic characteristic of the model vehicle 1d is expressed by a following formula (3).

A formula excluding the third term (a term including Mv) of the right side of the formula (3) is the same as conventionally well-known formulae (3.12), (3.13) disclosed in a conventionally well-known document (Masahito Abe, published by SANKAI-DO Co., Ltd., Apr. 10, 2003, first publication of second edition. This document is referred to as a non-patent literature 1 below) with a title of "Motion and Control of Vehicle".

$$\frac{d}{dT}\begin{bmatrix} \beta_{z\_d} \\ \gamma_d \end{bmatrix} = \begin{bmatrix} a11 & a12 \\ a21 & a22 \end{bmatrix} * \begin{bmatrix} \beta_{z\_d} \\ \gamma_d \end{bmatrix} + \begin{bmatrix} b1 \\ b2 \end{bmatrix} * \delta_d + \begin{bmatrix} b11 & 0 \\ 0 & b22 \end{bmatrix} * \begin{bmatrix} 0 \\ Mv \end{bmatrix} \quad (3)$$

where $$a11 = -\frac{2*(K_f + K_r)}{m*V_d}$$

$$a12 = -\frac{m*V_d^2 + 2*(L_f*K_f - L_r*K_r)}{m*V_d^2}$$

$$a21 = -\frac{2*(L_f*K_f - L_r*K_r)}{I}$$

$$a22 = -\frac{2*(L_f^2*K_f + L_r^2*K_r)}{I*V_d}$$

$$b1 = \frac{2*K_f}{m*V_d}$$

$$b2 = \frac{2*L_f*K_f}{I}$$

$$b11 = \frac{1}{m*V_d}$$

$$b22 = \frac{1}{I}$$

where m is a total mass of the model vehicle 1d;

Kf is a cornering power per wheel when the front wheel Wf of the model vehicle 1d is treated as the coupled body of the two right and left front wheels WfR, WfL (see FIG. 1);

Kr is a cornering power per wheel when the rear wheel Wr of the model vehicle 1d is treated as the coupled body of the two right and left rear wheels WrR, WrL (see FIG. 1);

Lf is a distance in the back-and-forth direction between the center of the front wheel Wf of the model vehicle id and the weighted center $C_G$;

Lr is a distance in the back-and-forth direction between the center of the rear wheel Wr of the model vehicle 1d and the weighted center $C_G$; and I is a moment of inertia of the model vehicle 1d around the yaw axis at the weighted center $C_G$.

The values of these parameters are set beforehand. In this case, for example, m, I, Lf, and Lr are the same values as those of the vehicle 1, or set to be substantially same as those of the vehicle 1. Also, Kf, and Kr are set in consideration of the characteristics of the tires of the front wheels WfL, WfR of the vehicle 1 and the rear wheels WrL, WrR thereof.

d($\beta$z_d)/dt in the formula (3) is the vehicle-body reference slip-angle velocity $\beta$'z_d of the model vehicle id.

The dynamic characteristic model of the model vehicle 1d in this embodiment corresponds to the dynamic characteristic model disclosed in Japan Patent No. 4143111, paragraphs from 0156 to 0168. Also, the virtual external-force yaw moment Mv of this embodiment corresponds to the "virtual external force Mvir" in Japan Patent No. 4143111. Regarding the "virtual external force Fvir" in Japan Patent No. 4143111, it is presumed in this embodiment that such a force is "0 (zero)", and the feedback of such a virtual external force is out of consideration. Accordingly, the detailed explanation thereof will be omitted in this specification.

<Difference Calculating Unit>

Next, returning to FIG. 2, an explanation will be given of the difference calculating unit 55.

The difference calculating unit 55 calculates the difference $\gamma$err between the actual yaw rate $\gamma$act and the reference yaw rate $\gamma$d, the difference $\beta$err between the vehicle-body actual slip angle $\beta$z_act and the vehicle-body reference slip angle $\beta$z_d and the difference $\beta$'err between the vehicle-body actual slip-angle velocity $\beta$'z_act and the vehicle-body reference-slip-angle velocity $\beta$'z_d, where the actual yaw rate $\gamma$act, the vehicle-body actual slip angle $\beta$z_act and the vehicle-body actual slip-angle velocity $\beta$'z_act are the actual attitude-state quantities input from the actual-state-quantity obtaining unit 52 and the reference yaw rate $\gamma$d, the vehicle-body reference slip angle $\beta$z_d and the vehicle-body reference-slip-angle velocity $\beta$'z_d are reference attitude-state quantities input from the reference dynamic-characteristic model calculating unit 54, respectively. The difference calculating unit 55 outputs the calculated differences to the feedback-target-value calculating unit 56 and the virtual external-force calculating unit 61. The differences $\gamma$err and $\beta$err $\beta$'err are calculated from the following formulae (4), (5), and (6).

$$\gamma err = \gamma act - \gamma d \quad (4)$$

$$\beta err = \beta z\_act - \beta z\_d \quad (5)$$

$$\beta' err = \beta' z\_act - \beta' z\_d \quad (6)$$

<FB-Target-Value Calculating Unit>

The FB-target-value calculating unit 56 performs yaw moment control around the weighted center of the vehicle 1 through the brake control ECU 29 based on the differences $\gamma$err, and $\beta$err, $\beta$'err by distributing the right and left braking forces to the front wheels WfR, WfL and the rear wheels WrR, and WrL, or calculates, from a following formula (7), a reference FB target-yaw-moment Mc_nom1 at the time of distributing the right and left driving forces of the front wheels WfR, WfL which are driving wheels through the hydraulic circuit 28, and outputs the calculated result to the feedback dead-zone processing unit 57.

$$Mc\_nom1 = K_1 \cdot \gamma err + K_2 \cdot \beta err + K_3 \cdot \beta' err \quad (7)$$

where $K_1$, $K_2$, and $K_3$ are feedback gains set beforehand.

<Feedback Dead-Zone Processing Unit>

Figure 4:
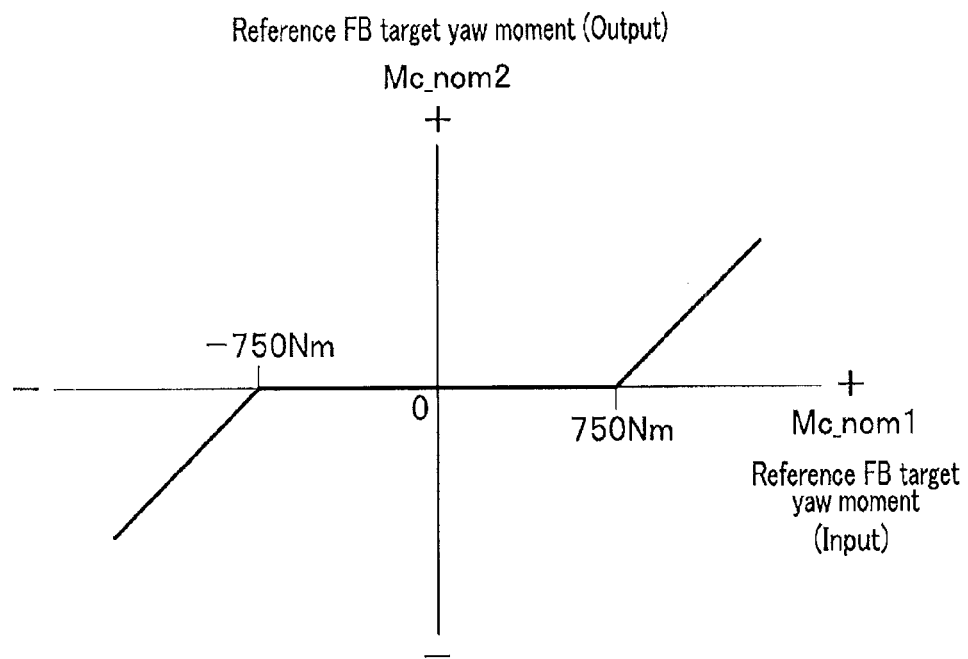
FIG. 4 is an explanatory diagram for a feedback dead-zone processing unit.

As shown in FIG. 4, the feedback dead-zone processing unit 57 sets a dead-zone of, for example, ±750 Nm (Newton meter) relative to the input reference FB target-yaw-moment Mc_nom1, and outputs/processes a reference FB target-yaw-moment Mc_nom2. By setting the dead-zone to the reference FB target-yaw-moment Mc_nom2 output relative to the input reference FB target-yaw-moment Mc_nom1, it is possible to prevent a yaw moment feed back control from being always performed in response to the slight differences $\gamma$err, $\beta$err, so that a stable yaw moment is enabled which does not cause the driver and a passenger to feel uncomfortable.

The reference FB target-yaw-moment Mc_nom2 output by the feedback dead-zone processing unit 57 is input to the adder 58.

<First Anti-Spin/Target-Yaw-Moment FB Control>

Next, returning to FIG. 2, an explanation will be given of the first anti-spin/target-yaw-moment FB (feedback) control by the rear-wheel actual-slip-angle correcting unit 65, the adder 66, the rear-wheel slip-angle dead-zone processing unit 67, and the first anti-spin/target-yaw-moment FB unit 68, etc. Through this control, in order to prevent the vehicle 1 (see FIG. 1) from spinning due to over-steering, a first anti-spin/ FB target-yaw-moment Mc1_asp is calculated through a formula (8) to be discussed later at the time of performing yaw moment control around the weighted center of the vehicle 1 through the brake control ECU 29 by distributing the right and left braking forces to the front wheels WfR, WfL and the rear wheels WrR, WrL, or through the hydraulic circuit 28 by distributing the right and left driving forces of the front wheels WfR, WfL which are driving wheels. The calculated anti-spin/FB target-yaw-moment Mc1_asp is input into the adder 58.

The rear-wheel actual-slip-angle correcting unit 65 multiplies a rear-wheel actual-slip-angle velocity $\beta$'r_act calculated by the actual-slip-angle velocity calculating unit 52f of the actual-state-quantity obtaining unit 52 by a constant $K_4$, and outputs the multiplication result to the adder 66. The adder 66 adds the input result and the rear-wheel actual slip angle $\beta$r_act calculated by the rear-wheel actual-slip-angle calculating unit 52e in order to obtain a rear-wheel actual-slip-angle $\beta$r_act1, and outputs the rear-wheel actual slip angle $\beta$r_act1 to the rear-wheel slip-angle dead-zone processing unit 67.

Figure 5:
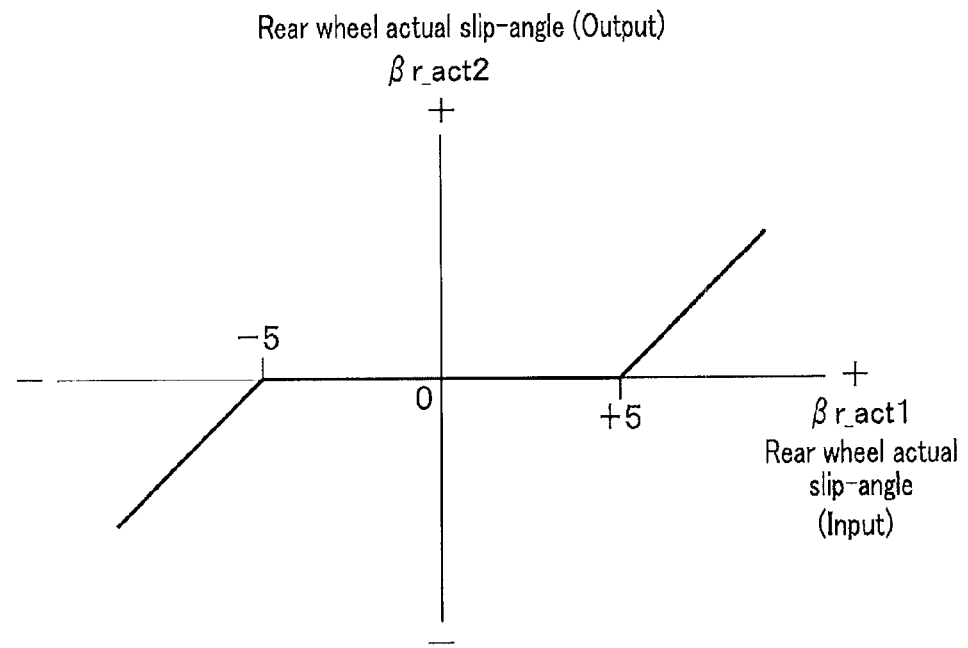
FIG. 5 is an explanatory diagram for a rear wheel slip angle dead zone processing unit.

The rear-wheel slip-angle dead-zone processing unit 67 sets a dead-zone of, for example, ±5 degrees relative to the input rear-wheel actual slip angle $\beta$r_act1 as shown in FIG. 5, and outputs and processes a rear-wheel actual slip angle $\beta$r_act2. By setting the dead-zone to the rear-wheel actual slip angle $\beta$r_act2 output relative to the input rear-wheel actual slip angle $\beta$r_act1, a feedback quantity of the anti-spin/target-yaw-moment control for suppressing a spin of the vehicle 1 (see FIG. 1) due to over-steering can be prevented from being changed in response to the slight change in the rear-wheel actual slip angle $\beta$r_act1, which allows to accomplish a stable anti-spin/target-yaw-moment control which does not cause the driver and the passenger to feel uncomfortable.

The rear-wheel actual slip angle $\beta$r_act2 output by the rear-wheel slip-angle dead-zone processing unit 67 is input to the first anti-spin/target-yaw-moment FB unit 68.

The anti-spin/target-yaw-moment FB unit 68 calculates an anti-spin/FB target-yaw-moment Mc1_asp from the following formula (8), and outputs the calculation result to the adder 58.

$$Mc1\_asp = K_5 \cdot \beta r\_act2 \quad (8)$$

where $K_5$ is a feedback gain set beforehand.

The adder 58 adds the reference FB target-yaw-moment Mc_nom2 input from the feedback dead-zone processing unit 57 and the first anti-spin/FB target-yaw-moment Mc1_asp input from the first anti-spin/target-yaw-moment FB unit 68 in order to obtain a FB target-yaw-moment Mc2 (the first control target yaw moment), and outputs the FB target-yaw-moment Mc2 to the actuator operation target-value synthesizing unit 59.

The larger the absolute value of the rear-wheel actual slip-angle velocity $\beta$'r_act is, the more the vehicle 1 is in an over-steered condition. Thus, in order to suppress such an over-steered condition, the adder 66 adds a result obtained by multiplying the rear-wheel actual-slip-angle velocity β'r_act by the constant $K_4$ at the rear-wheel actual-slip-angle correcting unit 65 and the rear-wheel actual slip angle βr_act.

《FB Target Value Output Control Unit》

The FB target value output control unit 62A receives an accuracy degree determination signal indicating the accuracy degree of the attitude-state quantity from the estimation accuracy determination unit 52g. When the accuracy degree of the attitude-state quantity is low, the FB target value output control unit 62A outputs a signal indicating 0 to the high value selection unit 64 without outputting the FB target yaw moment Mc2 to the high value selection unit 64.

《The Second Anti-Spin•Target Yaw Moment FB Control》

Next, the second anti-spin target yaw moment FB (feedback) control which is performed by the second vehicle body actual-slip angle velocity calculation unit 70, the second vehicle body actual-slip angle velocity dead zone processing unit 81 and the second anti-spin target yaw moment FB unit 82, etc. is described with reference to FIG. 2.

This control is to calculate the second anti-spin•FB target yaw moment Mc2_asp by using the equation (9), which will be described later, and inputs the second anti-spin•FB target yaw moment Mc2_asp to the high value selection unit 64. The second anti-spin•FB target yaw moment Mc2_asp is used for the control of the yaw moment around the gravity center of the vehicle 1 performed to prevent the spin of the vehicle 1 (see FIG. 1) due to an oversteer by distributing the left and right braking forces to the front wheels WfL, WfR and the rear wheels WrL, WrR through the brake control ECU 29 or by distributing the left and right driving forces to the front wheels WfL, WfR, which are the driven wheels, through the hydraulic circuit 28.

The second vehicle body actual-slip angle velocity calculation unit 70 calculates the second vehicle body actual-slip angle velocity β'z_emg1 based on the lateral acceleration Gs, the vehicle speed Vact, and the actual yaw rate γact, and inputs the second vehicle body actual-slip angle velocity β'z_emg1 to the second vehicle body actual-slip angle velocity dead zone processing unit 81. The second vehicle body actual-slip angle velocity calculation unit 70 is referred to just as "a vehicle body actual-slip angle velocity calculation unit 70" and the second vehicle body actual-slip angle velocity β'z_emg1 is referred to just as "a vehicle body actual-slip angle velocity β'z_emg1", hereinafter.

Unlike the vehicle body actual-slip-angle calculation unit 52f, the vehicle body actual-slip angle velocity calculation unit 70 calculates the vehicle body actual-slip angle velocity β'z_emg1 directly from the lateral acceleration Gs, the vehicle speed Vact and the actual yaw rate γact without using the vehicle body actual slip angle βz_act calculated by the vehicle body actual-slip-angle calculation unit 52c. A detailed description of a method performed by the vehicle body actual-slip angle velocity calculation unit 70 for calculating the vehicle body actual-slip angle velocity β'z_emg1 is described later.

Therefore, the vehicle body actual-slip angle velocity β'z_emg1 can be calculated more stably than the vehicle body actual-slip angle velocity β'z_act which is obtained by temporally differentiating the vehicle body actual slip angle βz_act. Especially, when the actual road friction coefficient is rapidly decreased or the vehicle 1 (see FIG. 1) starts to spin, the accuracy degree of the estimated road friction coefficient μ and the vehicle body actual-slip angle velocity β'z_act is decreased.

In such a case, the second anti-spin target yaw moment FB control functions as a backup.

Figure 6:
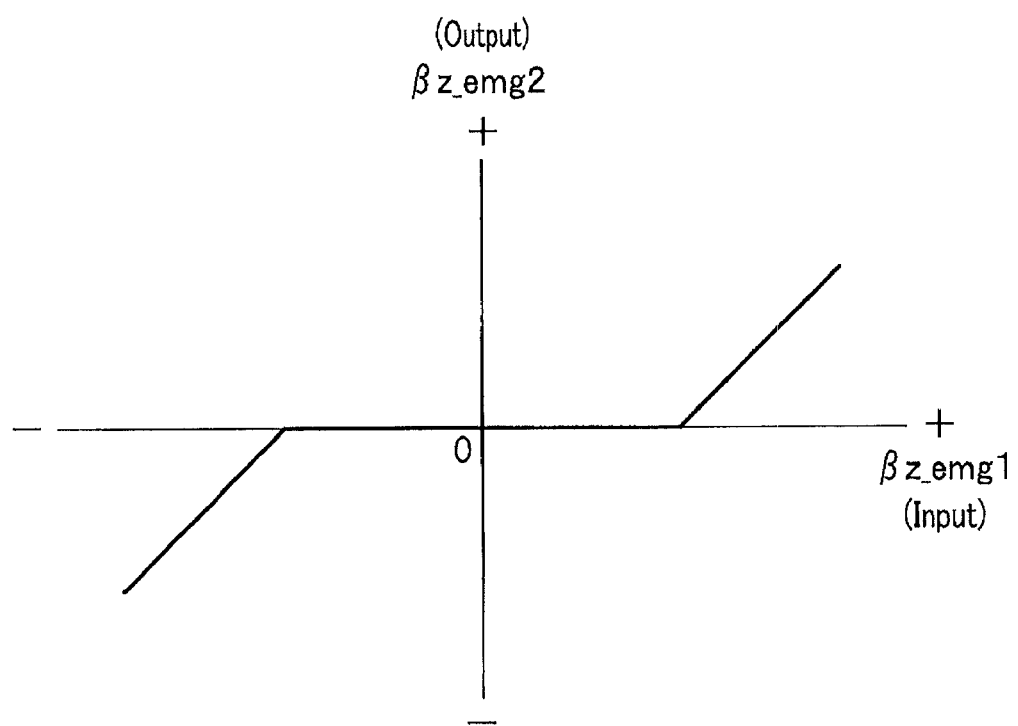
FIG. 6 is an explanatory diagram for the second vehicle body actual-slip angle velocity dead zone processing unit.

The second vehicle body actual-slip angle velocity dead zone processing unit 81 provides a predetermined dead zone to the input vehicle body actual-slip angle velocity β'z_emg1 and outputs the vehicle body actual-slip angle velocity β'z_emg2 as shown in FIG. 6. By providing the dead zone to the vehicle body actual-slip angle velocity β'z_emg2 which is output in response to the input vehicle body actual-slip angle velocity β'z_emg1 as described above, a feed back amount of the second anti-spin•target yaw moment FB control, which is for preventing the spin of the vehicle 1 (see FIG. 1) due to an oversteer, is prevented from being changed in response to a slight change of the vehicle body actual-slip angle velocity β'z_emg1, whereby a stable input of the second anti-spin•target yaw moment FB control can be realized which does not cause the passengers to feel uncomfortable.

The vehicle body actual-slip angle velocity β'z_emg2 which is output from the second vehicle body actual-slip angle velocity dead zone processing unit 81 is input to the second anti-spin target yaw moment FB unit 82.

The second anti-spin target yaw moment FB unit 82 calculates the second anti-spin•FB target yaw moment Mc2_asp by the PID control calculation and inputs the calculation result to the high value selection unit 64. The PID control calculation performed by the second anti-spin target yaw moment FB unit 82 is formally shown in the next equation (9).

$$Mc2\_asp = K10 \cdot \beta'z\_emg2 + K11 \cdot \smallint (\beta'z\_emg2) \\ dt + K12 \cdot d/dt(\beta'z\_emg2) \qquad (9)$$

where K10, K11, K12 are feedback gains that are set in advance.

The high value selection unit 64 compares the value of the FB target yaw moment Mc2 or the value of 0 which is input from the FB target value output control unit 62A with the value of the second anti-spin•FB target yaw moment Mc2_asp which is input from the second anti-spin target yaw moment FB unit 82, selects the higher value, and inputs the selected value to the actuator operation target-value synthesizing unit 59 as the FB target yaw moment Mc3.

The FB target yaw moment Mc2 and the second anti-spin•FB target yaw moment Mc2_asp may take a positive value or a negative value. Therefore, the description of "the high value selection unit 64 selects the higher value of the FB target yaw moment Mc2 and the second anti-spin•FB target yaw moment Mc2_asp" means that the high value selection unit 64 selects either one of the FB target yaw moment Mc2 and the second anti-spin•FB target yaw moment Mc2_asp which has the larger absolute value when the signs of the FB target yaw moment Mc2 and the second anti-spin•FB target yaw moment Mc2_asp are the same or at least one of the FB target yaw moment Mc2 and the second anti-spin•FB target yaw moment Mc2_asp is 0. When the signs of the FB target yaw moment Mc2 and the second anti-spin•FB target yaw moment Mc2_asp are different, the high value selection unit 64 selects the second anti-spin•FB target yaw moment Mc2_asp. The value selected in the high value selection unit 64 from the value of the FB target yaw moment Mc2 or 0 input from the FB target value output control unit 62A and the second anti-spin•FB target yaw moment Mc2_asp input from the second anti-spin target yaw moment FB unit 82 is input to the actuator operation target-value synthesizing unit 59 as the FB target yaw moment Mc3.

<Actuator Operation Target-Value Synthesizing Unit>

Next, actuator operation target-value synthesizing unit 59 is described. Input to the actuator operation target-value synthesizing unit 59 are signals indicating the deceleration of the transmission T/M, such as an engine torque, an engine rev speed, etc., from the engine ECU 27, a signal from the acceleration pedal position sensor 3, a signal from the brake pedal position sensor 4, and the vehicle speed Vact, etc., from the vehicle-speed calculating unit 52a of the actual-state-quantity obtaining unit 52.

The actuator operation target-value synthesizing unit 59 comprises an actuator operation FB target-value distributing/processing unit 59a which distributes the FB target-yaw-moment Mc2 input from the adder 58 to the driving and braking forces of individual wheels W, and a synthesizing/outputting unit 59b which adds the calculation result by the actuator operation FB target-value distributing/processing unit 59a and an FF target value input from the FF target-value setting unit 51, and which outputs the addition result to the hydraulic circuit 28 and the brake control ECU 29.

The actuator operation FB target-value distributing/processing unit 59a substantially corresponds to the "actuator operation FB target-value distributing/processing unit 222" disclosed in, for example, Japan Patent No. 4143111, paragraphs from 0284 to 0369, and FIG. 12. The actuator operation FB target-value distributing/processing unit 59a calculates and sets a FB target first-wheel brake driving/braking force by the brake BfL, a FB target second-wheel brake driving/braking force by the brake BfR, a FB target third-wheel brake driving/braking force by the brake BrL, and a FB target fourth-wheel brake driving/braking force by the brake BrR to the front wheel WfL, the front wheel WfR, the rear wheel WrL, and the rear wheel WrR, respectively.

The synthesizing/outputting unit 59b substantially corresponds to the "actuator operation target-value synthesizing unit 24" disclosed in, for example, Japan Patent 4143111, paragraphs from 0378 to 0419 and FIG. 18.

More specifically, the synthesizing/outputting unit 59b calculates a target first-wheel brake driving/braking force by the brake BfL and a target first-wheel slip ratio based on the FF target first-wheel brake driving/braking force and the FF target first-wheel driving system driving/braking force both set by the FF target-value setting unit 51, and the FB target first-wheel brake driving/braking force calculated and set by the actuator operation FB target-value distributing/processing unit 59a, and outputs those calculated results to the brake control ECU 29.

Also, the synthesizing/outputting unit 59b calculates a target second-wheel brake driving/braking force by the brake BfR and a target second-wheel slip ratio based on the FF target second-wheel brake driving/braking force and the FF target second-wheel driving system driving/braking force both set by the FF target-value setting unit 51, and the FB target second-wheel brake driving/braking force calculated and set by the actuator operation FB target-value distributing/processing unit 59a, and outputs those calculated results to the brake control ECU 29.

Also, the synthesizing/outputting unit 59b calculates a target third-wheel brake driving/braking force by the brake BrL and a target third-wheel slip ratio based on the FF target third-wheel brake driving/braking force and the FF target third-wheel driving system driving/braking force both set by the FF target-value setting unit 51, and the FB target third-wheel brake driving/braking force calculated and set by the actuator operation FB target-value distributing/processing unit 59a, and outputs those calculated results to the brake control ECU 29.

Also, the synthesizing/outputting unit 59b calculates a target fourth-wheel brake driving/braking force by the brake BrR and a target fourth-wheel slip ratio based on the FF target fourth-wheel brake driving/braking force and the FF target fourth-wheel driving system driving/braking force both set by the FF target-value setting unit 51, and the FB target fourth-wheel brake driving/braking force calculated and set by the actuator operation FB target-value distributing/processing unit 59a, and outputs those calculated results to the brake control ECU 29.

The front-wheel actual slip angle $\beta f\_act$, the rear-wheel actual slip angle $\beta r\_act$, and the road friction coefficient $\mu$ calculated by the actual-state-quantity obtaining unit 52 are used when the target nth (where n=1 to 4) wheel brake driving/braking force of individual wheel W and the target nth wheel slip ratio are calculated.

Also, the synthesizing/outputting unit 59b outputs the target first-wheel driving system driving/braking force and the FF target second-wheel driving system driving/braking force set by the FF target-value setting unit 51 to the hydraulic circuit 28, and outputs the FF target mission deceleration ratio set by the FF target-value setting unit 51 to the engine ECU 27 that also controls the transmission T/M.

<Virtual External-Force Calculating Unit>

Next, the virtual external-force calculating unit 61 is described. The virtual external-force calculating unit 61 calculates the virtual external-force yaw moment Mv around the weighted center $C_G$ of the model vehicle 1d through a following formula (10) based on the deviations $\gamma err$, and $\beta err$, and outputs the calculated result to the adder 63.

$$Mv = K_6 \cdot \gamma err + K_7 \cdot \beta err \qquad (10)$$

The function of the virtual external-force calculating unit 61 substantially corresponds to the virtual external-force provisional value setting unit 201 disclosed in FIG. 9, etc., of Japanese Patent 4143111. However, the virtual external-force calculating unit 61 in this embodiment is different from the virtual external-force provisional value setting unit 201 in that only the virtual external-force yaw moment Mv is calculated.

$K_6$ and $K_7$ are feedback gains set beforehand.

<First Anti-Spin/Virtual Yaw-Moment FB Control>

Next, with reference to FIG. 2, an explanation will be given of a first anti-spin/virtual yaw-moment FB (feedback) control. This control is to calculate a first anti-spin/virtual FB yaw moment Mv1_asp around the weighted center $C_G$ (see FIG. 3) of the model vehicle 1d from a formula (11) to be discussed later and to input the calculated first anti-spin/virtual FB yaw moment, Mv1_asp to the adder 63 in order to suppress a spin of the model vehicle 1d (see FIG. 1) due to an over-steering.

$$Mv1\_asp = K_9 \cdot \beta r\_act2 \qquad (11)$$

where $K_9$ is a feedback gain set beforehand. The feedback gain $K_9$ may have the same value as that of the feedback gain $K_5$.

《Second Anti-Spin/Virtual Yaw Moment Control》

Next, the second anti-spin/virtual yaw moment FB (feedback) control is described with reference to FIG. 2. The vehicle body actual-slip angle velocity $\beta'z\_emg2$ output from the second vehicle body actual-slip angle velocity dead zone processing unit 81 is also input to the second anti-spin/virtual yaw moment FB unit 83.

The second anti-spin/virtual yaw moment FB unit 83 calculates the second anti-spin virtual FB yaw moment Mv2_asp by the PID control calculation, and inputs the calculation result to the adder 63. The PID control calculation performed by the second anti-spin/virtual yaw moment FB unit 83 is formally shown in the following equation (12), $$Mv2\_asp = K13 \cdot \beta'z\_emg2 + K14 \cdot \int (\beta'z\_emg2)dt + K15 \cdot d/dt(\beta'z\_emg2) \qquad (12)$$

where K13, K14, K15 are feedback gains that are set in advance.

Similarly to the second anti-spin target yaw moment FB control, the second anti-spin/virtual yaw moment control is realized based on the fact that the vehicle body actual-slip angle velocity β'z_emg1 can be calculated more stably than the vehicle body actual-slip angle velocity β'z_act which is obtained by temporally differentiating the vehicle body actual slip angle βz_act. Especially, even when the road friction coefficient μ becomes small or the vehicle 1 (see FIG. 1) is in a braking state and starts to spin, the second anti-spin/virtual yaw moment control functions as a backup so that the reference yaw rate γd, the reference vehicle body slip angle βz_d and the reference vehicle body slip angle velocity β'z_d, which are reference attitude-state quantities of the vehicle 1 of the dynamic characteristic model of the model vehicle 1d, do not disperse and the differences γerr, βerr, β'err do not become too large.

The adder 63 adds the virtual external force yaw moment Mv, the first first anti-spin/virtual FB yaw moment Mv1_asp, and the second anti-spin virtual FB yaw moment Mv2_asp and inputs the adding result to the reference dynamic-characteristic model calculating unit 54.

Figure 7:
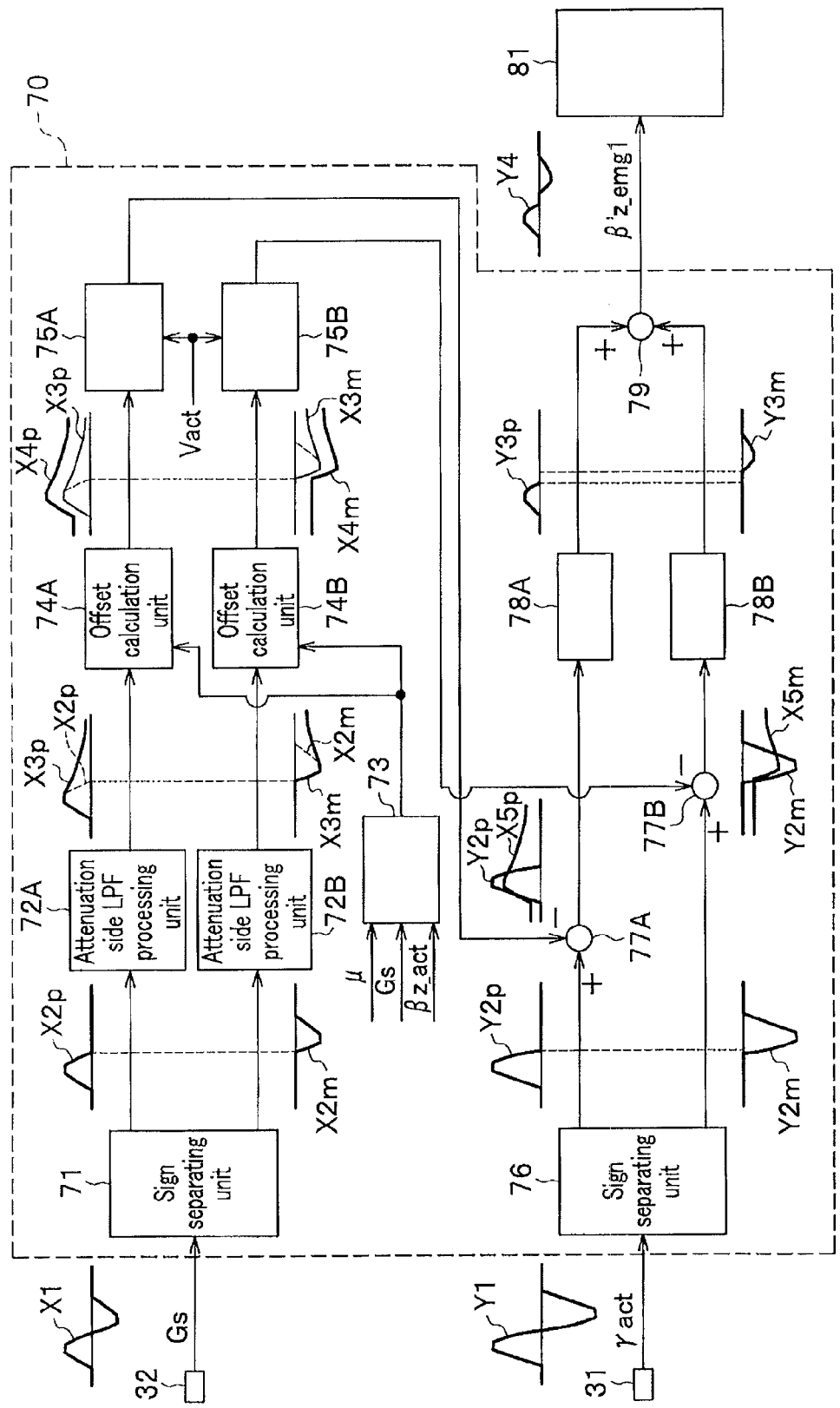
FIG. 7 is a block functional configuration diagram of the second vehicle body actual-slip angle velocity calculation unit.

Next, a detailed functional block configuration of the vehicle body actual-slip angle velocity calculation unit 70 is described with reference to FIG. 7. FIG. 7 is a detailed block mechanism map of the second vehicle body actual-slip angle velocity calculation unit. The vehicle body actual-slip angle velocity calculation unit 70 is comprised of sing separating parts 71, 76, an attenuation side LPF (low-pass filter) processing units 72A, 72B, a vehicle body actual slip angle accuracy degree data unit (a vehicle body slip angle estimation accuracy determination unit) 73 (hereinafter, referred to as "βz_act accuracy degree data unit 73"), offset calculation units 74A, 74B, orbital yaw rate calculation units 75A, 75B, deducing units 77A, 77B, a positive value determination unit 78A, a negative value determination unit 78B, and a synthetic adder part 79.

The vehicle body actual-slip angle velocity calculation unit 70 uses, as an input, a signal of the actual yaw rate γact from the actual yaw rate sensor 31, the lateral acceleration Gs from the lateral acceleration sensor 32, the vehicle speed Vact calculated at the vehicle speed calculation unit 52a, the road friction coefficient μ estimated by the friction coefficient estimating/calculating unit 52b, and the vehicle body actual slip angle βz_act estimated by the vehicle body actual-slip-angle calculation unit 52c or the accuracy degree of the actual attitude-state quantity determined by the estimation accuracy determination unit 52g.

The sing separating part 71 separates, as shown in FIG. 7, a signal of the lateral acceleration Gs indicated by the curved line X1, for example, into the positive (≧0) side signal (indicated by the curved line X2 in FIG. 7) and the negative (≦0) side signal (indicated by the curved line X2m in FIG. 7). It is to be noted that in the curved lines X1, X2p, X2m and the curved lines X3p, X3m, X4p, X4m, X5p, X5m, Y1, Y2p, Y2m, Y3p, Y3m shown in FIG. 7, the lateral axis represents a time axis.

The thin dotted line which vertically connects the curved line X2p and the curved line X2m is drawn for illustrating the relative temporal relationship between the wave forms of the positive side of the curved line X2p and the negative side of the curved line X2m. The vertical thin dotted line between the curved line X3p and the curved line X3m, the vertical thin dotted line between the curved line X4p and the curved line X4m, the vertical thin dotted line between the curved line Y2p and the curved line Y2m, and the vertical thin dotted line between the curved line Y3p and the curved line Y3m are drawn for the same purpose.

The attenuation side LPF processing unit 72A performs a low pass filter processing on the declining part (a part attenuating to 0) of the wave form of the curved line X2p which indicates the positive side lateral acceleration Gs which has been separated by the sing separating part 71 to obtain the signal of the curved line X3p with respect to the curved line X2p. Similarly, the attenuation side LPF processing unit 72B performs a low pass filter processing on the declining part (a part attenuating to 0) of the waveform of the curved line X2m indicating the negative side lateral acceleration Gs separated by the sing separating part 71 to obtain the signal of the curved line X3m with respect to the curved line X2m.

It is to be noted that the amounts indicated by the curved lines X3p, X3m correspond to "a road surface limit yaw rate" based on the lateral acceleration Gs.

The βz_act accuracy degree data unit 73 includes a function or a table which is used to estimate the accuracy degree of the vehicle body actual slip angle δz_act by taking the road friction coefficient μ, the lateral acceleration Gs and the vehicle body actual slip angle δz_act, etc. as parameters. The βz_act accuracy degree data unit 73 refers to the road friction coefficient μ, the lateral acceleration Gs and the vehicle body actual slip angle βz_act to estimate the accuracy degree of the vehicle body actual slip angle βz_act, and inputs the estimated accuracy degree of the vehicle body actual slip angle βz_act to the offset calculation units 74A, 74B.

Parameters of the function or the table of the βz_act accuracy degree data unit 73 may also include the vehicle speed Vact, the steering angle δ, estimated motion state quantity which is estimated by these values, or the actual yaw rate γ_act, etc.

The offset calculation unit 74A sets a positive offset quantity based on the accuracy degree of the vehicle body actual slip angle βz_act which has been estimated by the βz_act accuracy degree data unit 73, and adds the positive offset quantity to the curved line X3p to generate the curved line X4p. The offset calculation unit 74B sets the negative offset quantity based on the accuracy degree of the vehicle body actual slip angle βz_act which has been estimated by the βz_act accuracy degree data unit 73, and adds the negative offset quantity to the curved line X3m to generate the curved line X4m.

Here, the greater the accuracy degree of the vehicle body actual slip angle βz_act than a predetermined value, the greater the absolute value of the offset quantity is set. On the other hand, the lower the accuracy degree of the vehicle body actual slip angle βz_act than a predetermined value, the smaller the absolute value of the offset quantity is set. With respect to one value of the accuracy degree of the vehicle body actual slip angle βz_act, absolute values of the offset quantities set by the offset calculation units 74A, 74B are the same.

The orbital yaw rate calculation unit 75A performs division processing on the curved line X4p with the vehicle speed Vact to generate the curved line X5p, and inputs the curved line X5p in the deducing unit 77A. Similarly, the orbital yaw rate calculation unit 75B performs a division processing on the curved line X4m with the vehicle speed Vact to generate the curved line X5m, and inputs the curved line X5m to the deducing unit 77B. Here, signals indicated by the curved lines, X1, X2p, X2m, X3p, X3m, X4p, X4m are dimensions of the lateral acceleration. On the other hand, the curved lines X5p, X5m are generated by dividing the quantities of the dimension of the lateral acceleration with the vehicle speed Vact. Generally, a value obtained by dividing the lateral acceleration Gs with the vehicle speed Vact is referred to as an orbital yaw rate. This is because the value obtained by dividing the lateral acceleration Gs with the vehicle speed Vact represents a yaw rate which is generated around the gravity center of the vehicle provided that the vehicle 1 (see FIG. 1) turns in an attitude that the longitudinal axis of the vehicle body is along the tangential direction of the turning trajectory.

As shown in FIG. 7, the sing separating part 76 separates the signal of the actual yaw rate γact indicated by the curved line Y1 to the positive side ($\geqq 0$) (indicated by the curved line Y2$p$ in FIG. 7) of the signal and the negative side ($\leqq 0$) of the signal (indicated by the curved line Y2$m$ in FIG. 7), and inputs them to the deducing units 77A, 77B, respectively.

In the deducing unit 77A, the curved line Y2$p$ indicating the positive side actual yaw rate is deduced by the curved line X5$p$ calculated by the orbital yaw rate calculation unit 75A, and inputs the result to the positive value determination unit 78A. In the deducing unit 77B, the curved line Y2$m$ indicating the negative side actual yaw rate is deduced by the curved line X5$m$ which is calculated by the orbital yaw rate calculation unit 75B, and inputs the result of the calculation to the negative value determination unit 78B.

The positive value determination unit 78A generates the curved line Y3$p$ by passing only the positive value or the value of 0 ($\geqq 0$) of the result of the calculation in which the curved line Y2$p$ calculated by the deducing unit 77A is deduced by the curved line X5$p$, and inputs the curved line Y3$p$ to the synthetic adder part 79. The negative value determination unit 78B generates the curved line Y3$m$ by passing only the negative value (<0) of the result of the calculation of the deducing unit 77B deducing the curved line Y2$m$ by the curved line X5$m$, and inputs the curved line Y3$m$ to the synthetic adder part 79.

The synthetic adder part 79 synthesizes data of the curved lines Y3$p$, Y3$m$ to generate the curved line Y4 indicating the vehicle body actual-slip angle velocity $\beta'z\_emg1$ and inputs the curved line Y4 to the second vehicle body actual-slip angle velocity dead zone processing unit 81.

The vehicle body actual-slip angle velocity $\beta'z\_emg1$ that is highly stable can be obtained based on the actual yaw rate γact, the lateral acceleration Gs and the vehicle speed Vact in the vehicle body actual-slip angle velocity calculation unit 70 as described above.

When the estimation accuracy determination unit 52$g$ determines that the difference between the estimated lateral acceleration $Gs\_es\ t = Kc \times \mu$ (Kc represents a gain determined by the specification of the vehicle 1) estimated based on the road friction coefficient μ estimated by the friction coefficient estimating/calculating unit 52$b$, the steering angle δ and the vehicle speed Vact and the lateral acceleration Gs from the lateral acceleration sensor 32 is more than or equal to a predetermined value, the real road friction coefficient may be smaller than the estimated road friction coefficient μ. In this case, the reliability of the vehicle body actual slip angle $\beta z\_act$ which is estimated by the vehicle body actual-slip-angle calculation unit 52$c$ is decreased.

The actual-slip-angle velocity calculation unit 52$f$ calculates the vehicle body actual slip angle velocity $\beta'z\_act$ and the rear-wheel actual-slip-angle velocity $\beta'r\_act$ based on the vehicle body actual slip angle $\beta z\_act$, and the FB target value calculation unit 56 calculates the reference FB target yaw moment Mc_nom 1. The feedback dead zone processing unit 57 performs the dead zone processing on the reference FB target yaw moment Mc_nom1 to generate the reference FB target yaw moment Mc_nom2.

The first anti-spin target yaw moment FB unit 68 calculates the first anti-spin•FB target yaw moment Mc1_asp. Finally, the reference FB target yaw moment Mc_nom2 and the first anti-spin•FB target yaw moment Mc1_asp are added to obtain the FB target yaw moment Mc2, however, the reliability of the FB target yaw moment Mc2 is low. Thus, the yaw moment control may not be as desired by the driver.

In the embodiment, however, the FB target value output control unit 62A outputs a signal of the value 0 to the high value selection unit 64 without outputting the FB target yaw moment Mc2 to the high value selection unit 64 if the FB target value output control unit 62A keeps receiving from the estimation accuracy determination unit 52$g$ the estimation accuracy degree determination signal indicating that the estimation accuracy degree of the actual attitude-state quantity is low or is not usable.

Therefore, the high value selection unit 64 selects the value of the second anti-spin•FB target yaw moment Mc2_asp input from the second anti-spin target yaw moment FB unit 82 as the FB target yaw moment Mc3, and inputs the second anti-spin•FB target yaw moment Mc2_asp to the actuator operation target-value synthesizing unit 59.

As a result, even when the reliability of the vehicle body actual slip angle $\beta z\_act$ is low, it is possible to perform a yaw moment control based on the stable vehicle body actual-slip angle velocity $\beta'z\_emg1$ without depending on the vehicle body actual slip angle $\beta z\_act$, whereby a stable motion control is realized.

In a case where the reliability of the vehicle body actual slip angle $\beta z\_act$ is low, the dynamic characteristic model may be dispersed even if the reference dynamic-characteristic model calculating unit 54 calculates the reference yaw rate γd, the reference vehicle body slip angle $\beta z\_d$ and the reference vehicle body slip angle velocity $\beta'z\_d$ by the repeated calculation, the difference calculation unit 55 calculates the differences γerr, βerr, β'err, and the adder 63 adds the virtual external force yaw moment Mv calculated by the virtual external force calculation unit 61 and the first anti-spin/virtual FB yaw moment Mv1_asp calculated by the first anti-spin/virtual yaw-moment FB unit 69 and feedbacks the added value to the dynamic characteristic model of the reference dynamic-characteristic model calculating unit 54.

In accordance with the embodiment, however, it is possible to stabilize the calculation of the dynamic characteristic model in the reference dynamic-characteristic model calculating unit 54 by inputting the second anti-spin virtual FB yaw moment Mv2_asp to the adder 63 from the second anti-spin/virtual yaw moment FB unit 83.

The lower the accuracy degree of the vehicle body actual slip angle $\beta z\_act$ is, the lower the offset calculation units 74A, 74B set the offset amounts, depending on the accuracy degree of the vehicle body actual slip angle $\beta z\_act$ in the $\beta z\_act$ accuracy degree data unit 73 when the FB target value output control unit 62A receives an estimated accuracy degree determination signal from the estimation accuracy determination unit 52$g$. This has an effect of increasing the absolute value of the vehicle body actual-slip angle velocity $\beta'z\_emg1$. As a result, it becomes more likely that the second anti-spin•FB target yaw moment Mc2_asp is selected as higher than the FB target yaw moment Mc2 output from the FB target value output control unit 62A when the FB target yaw moment Mc2 and the second anti-spin•FB target yaw moment Mc2_asp are compared and the second anti-spin•FB target yaw moment Mc2_asp is output to the actuator operation target-value synthesizing unit 59 as the FB target yaw moment Mc3, which allows to perform more stable yaw moment control.

When the absolute value of the vehicle body actual-slip angle velocity β'z_emg1 is made larger, the absolute value of the second anti-spin virtual FB yaw moment Mv2_asp becomes also larger, which enables to make the calculation of the dynamic characteristic model by the reference dynamic-characteristic model calculating unit 54 through the adder 63 be stable.

On the other hand, the larger the accuracy degree of the vehicle body actual slip angle βz_act is, the larger the offset calculation unit 74A, 74B set the offset amounts, depending on the accuracy degree of the vehicle body actual slip angle βz_act in the βz_act accuracy degree data unit 73 when the FB target value output control unit 62A receives from the estimation accuracy determination unit 52g an accuracy degree determination signal indicating that the accuracy degree is high. This has an effect of decreasing the absolute value of the vehicle body actual-slip angle velocity β'z_emg1. As a result, it is more likely that the FB target yaw moment Mc2 is selected as higher than the second anti-spin•FB target yaw moment Mc2_asp when the FB target yaw moment Mc2 output from the FB target value output control unit 62A and the second anti-spin•FB target yaw moment Mc2_asp are compared and the FB target yaw moment Mc2 is output to the actuator operation target-value synthesizing unit 59 as the FB target yaw moment Mc3. This enables to perform a yaw moment control based on the actual attitude-state quantity with an excellent responsiveness and little control amount variation.

The processing performed by the offset calculation units 74A, 74B to set the offset amounts to be larger as the accuracy degree of the vehicle body actual slip angle βz_act becomes larger and to set the offset amounts to be lower as the accuracy degree of the vehicle body actual slip angle βz_act becomes lower may also be referred to as "changing the output of the vehicle body slip angle velocity based on the accuracy degree of the vehicle body actual slip angle".

《 Modification of the First Embodiment》

Next, a modification of the embodiment is described.

In the first embodiment, the high value selection unit 64 compares the value of the FB target yaw moment Mc2 or the value of 0 output from the FB target value output control unit 62A with the value of the second anti-spin•FB target yaw moment Mc2_asp output from the second anti-spin target yaw moment FB unit 82 and outputs the higher one of the two values, however, the present invention is not limited to this. The high value selection unit 64 may obtain the vehicle body actual slip angle βz_act as shown in the dashed arrow in FIG. 2. When the absolute value of the vehicle body actual slip angle βz_act is lower than a predetermined value, the high value selection unit 64 may restrict an absolute value of the FB target yaw moment Mc3 to be lower than or equal to a predetermined value and output the FB target yaw moment Mc3.

By restricting the value of the FB target yaw moment Mc3 to be output to the actuator operation target-value synthesizing unit 59 as described above, it is possible to prevent the FB target yaw moment Mc3, which is for preventing the spin of the vehicle, from excessively feedbacking due to a calculation error or the noises of the yaw rate sensor 31 and the lateral acceleration sensor 32, etc. when the vehicle is not under an over steer condition. This enables to perform the control of the vehicle motion which does not give unnatural feeling to passengers.

The Second Embodiment

Figure 8:
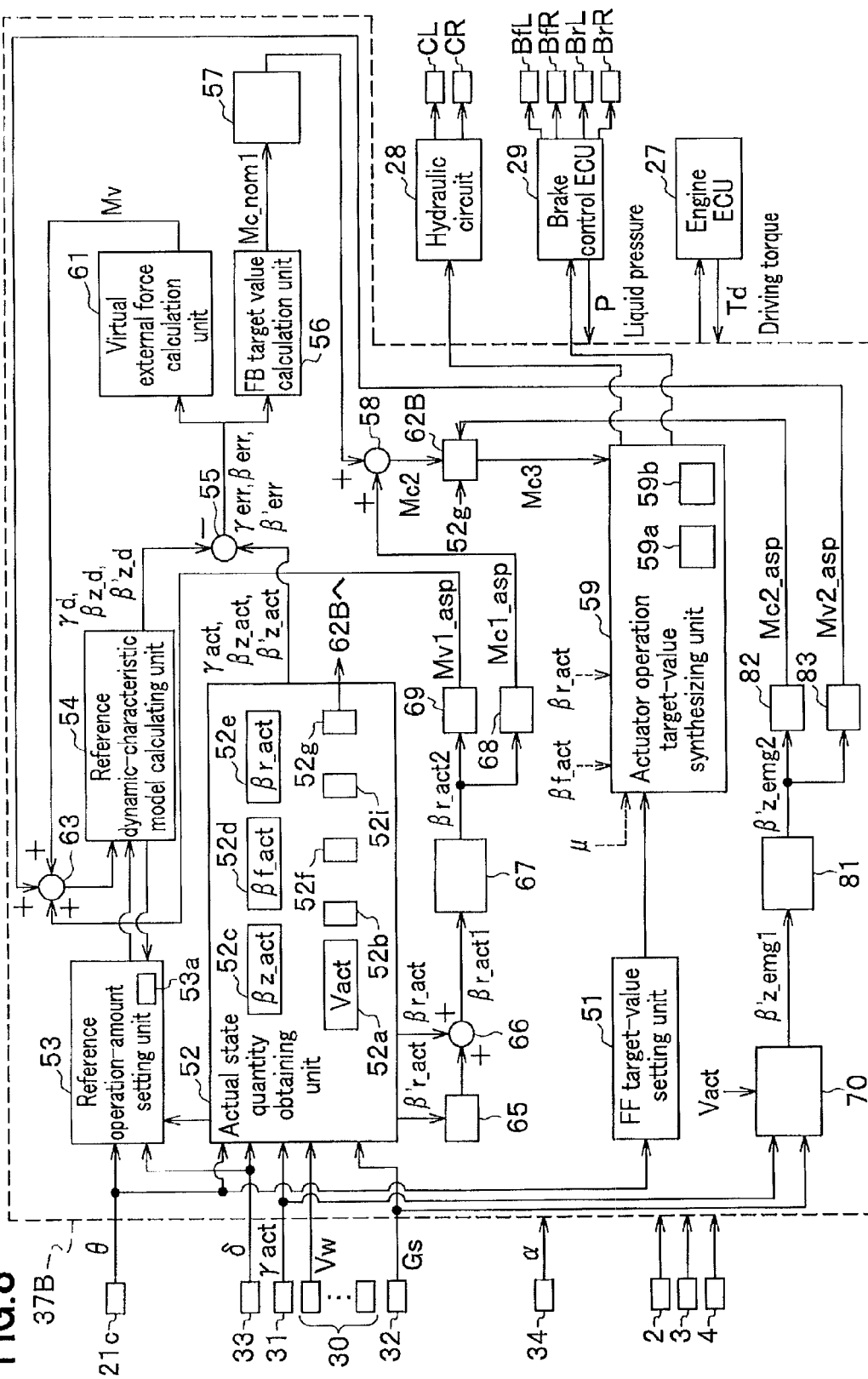
FIG. 8 is a block functional configuration diagram for explaining a control logic performed by a vehicle motion control apparatus according to the second.

Next, the second embodiment is described with reference to FIG. 8. FIG. 8 is a block functional diagram for explaining control logic in the vehicle motion control apparatus according to the second embodiment.

The FB target value output control unit 62A and the high value selection unit 64 are used in the first embodiment, however, in the second embodiment, the FB target value output control unit 62B is used instead of the FB target value output control unit 62A and the high value selection unit 64. Components of the second embodiment which are the same as those of the first embodiment are assigned similar reference numerals and the descriptions thereof are omitted.

<Estimation Accuracy Degree Determination Unit>

The estimation accuracy determination unit 52g in the second embodiment monitors signals from the select bar position sensor 2, the accelerator pedal position sensor 3, the brake pedal position sensor 4, the wheel speed sensors 30fL, 30fR, 30rL, 30rR, the yaw rate sensor 31, the lateral acceleration sensor 32, the steering angle sensor 33, and the longitudinal direction acceleration sensor 34. When the friction coefficient μ estimated by the friction coefficient estimating/calculating unit 52b is large even though the lateral acceleration is small under the condition where the steering angle is more than or equal to a predetermined value or when the friction coefficient μ is large even though the slip rate is large, an error of the output value of the friction coefficient estimating/calculating unit 52b to the actual road friction coefficient may be large. Thus, the estimation accuracy determination unit 52g determines that the estimation accuracy degree of the vehicle body actual slip angle βz_act calculated by the vehicle body actual-slip-angle calculation unit 52c is low, sets the weight (priority degree) G2 (described later) of the second anti-spin•FB target yaw moment Mc2_asp calculated based on the vehicle body actual-slip angle velocity β'z_emg2 to be higher, sets the gravity (priority degree) G1 of the FB target yaw moment Mc2 to be lower and inputs G1 and G2 to the FB target value output control unit 6213.

To perform this processing, the estimation accuracy determination unit 52g includes a function data unit or a table data unit for setting a priority degree (not shown). The function data unit or the table data unit calculates the gravities G1, G2 by taking the vehicle body actual-slip angle velocity B'z_act, the vehicle body actual-slip angle velocity β'z_emg2, the vehicle speed Vact, the steering angle δ, the estimated road friction coefficient μ, and a signal indicating whether or not the vehicle is under the braking state or the non-braking state as parameters.

The estimation accuracy determination unit 52g and the FB target value output control unit 62B may also be referred to as "a priority degree selection unit".

It is to be noted that in the aforementioned priority degree setting process, the gravities G1, G2 may be set based on the slip ratio of each wheel W calculated by the vehicle speed calculation unit 52a, the reference attitude-state quantity calculated by the reference motion characteristics model calculation unit 54, the actual attitude-state quantity of the vehicle 1, and the difference calculated by the difference calculation unit 55, etc.

The FB target value output control unit 62B uses the gravities G1, G2 input from the estimation accuracy determination unit 52g to calculate the FB target yaw moment Mc3 as shown in the following equation (13), and outputs the FB target yaw moment Mc3 to the actuator operation target-value synthesizing unit 59.

$$Mc3 = G1 \cdot Mc2 + G2 \cdot Mc2\_asp \qquad (13)$$

In the second embodiment, in a case where the accuracy degree of the estimation calculation vehicle body actual slip angle βz_act is decreased, the gravity G1 is set lower and the gravity G2 is set higher. In contrast, in a case where the accuracy degree of the estimation calculation of the vehicle body actual slip angle βz_act is high, the gravity G1 is set higher and the gravity G2 is set lower. This enables to perform a stable motion control of the vehicle 1.

How the gravities G1, G2 are set is not limited to the way described in the second embodiment. The gravity G1 may be set higher and the gravity G2 may be set lower as the accuracy degree of the βz_act becomes higher, and the gravity G1 may be set lower and the gravity G2 may be set higher as the accuracy degree of the βz_act becomes lower, by using the data in the βz_act accuracy degree data unit 73.

The summed value of the gravities G1 and G2 is preferably set to be 1.0.

The gravity G1 of the FB target yaw moment Mc2 and the gravity G2 of the second anti-spin•FB target yaw moment Mc2_asp may be set such that the gravities G1, G2 are continuously changed.

In accordance with the present invention, when the estimation accuracy determination unit 52g determines that the estimation accuracy of the vehicle body actual slip angle βz_act is low, the estimation accuracy determination unit 52g relatively increases the gravity G2 of the second anti-spin•FB target yaw moment Mc2_asp calculated based on the vehicle body actual-slip angle velocity 6z emg1, and relatively decreases the gravity of the FB target yaw moment Mc2 calculated based on the vehicle body actual slip angle βz_act, and determines the FB target yaw moment Mc 3. As a result, even when the accuracy degree of the vehicle body actual slip angle βz_act gets lower, a stable vehicle control of the vehicle 1 is realized.

In a case where the absolute value of the vehicle body actual slip angle βz_act is smaller than a predetermined value when the FB target value output control unit 62B obtains the vehicle body actual slip angle βz_act as in the modification of the first embodiment, the FB target value output control unit 62B may restrict the absolute value of the FB target yaw moment Mc3 to be lower than or equal to a predetermined value, determining that the vehicle is not under an over steer condition and output the FB target yaw moment Mc3.

By restricting the value of the FB target yaw moment Mc3 to be output to the actuator operation target-value synthesizing unit 59 as described above, it is possible to prevent the FB target yaw moment Mc3, which is for preventing the spin of the vehicle, from excessively feedbacking by an computation error or noises of the yaw rate sensor 31 and the lateral acceleration sensor 32, etc. when the vehicle is not under an over steer condition. This enables to perform the control of the vehicle motion which does not give unnatural feeling to passengers.

What is claimed is:

1. A vehicle motion control apparatus comprising:
   an operated state detecting unit which detects an operated state quantity of a vehicle given by a driver;
   a motion state detecting unit which detects a motion state quantity of the vehicle, the motion state detecting unit including at least a lateral acceleration sensor which detects a lateral acceleration and a yaw rate sensor which detects an actual yaw rate;
   a reference attitude-state quantity calculation unit for calculating a reference attitude-state quantity of the vehicle which corresponds to the operated state quantity and the motion state quantity of the vehicle based on a vehicle motion model which is a motion model of the vehicle under a condition in which a predetermined external force is applied to the vehicle;
   an actual attitude state determining unit which determines an actual attitude-state quantity of the vehicle based on detection signals from the operated state detecting unit and the motion state detecting unit;
   an attitude-state quantity difference calculation unit which calculates a difference between the reference attitude-state quantity of the vehicle and the actual attitude-state quantity of the vehicle;
   a virtual external force calculation unit which corrects the external force based on the difference calculated by the attitude-state quantity difference calculation unit and feedbacks the corrected external force to the reference attitude-state quantity calculation unit, and
   an actuator control unit which determines a control target amount of an actuator generating a vehicle motion,
   a vehicle slip angle velocity calculation unit which calculates a vehicle slip angle velocity based on the lateral acceleration and the actual yaw rate, wherein
   the actuator control unit determines the target control amount of the actuator based on at least one of the vehicle slip angle velocity, the actual attitude-state quantity of the vehicle and the difference between the reference attitude-state quantity of the vehicle and the actual attitude-state quantity of the vehicle.

2. The vehicle motion control apparatus according to claim 1, further comprising:
   a target control amount determination control unit which allows a determination of the target control amount of the actuator based on at least one of the actual attitude-state quantity and the vehicle slip angle velocity and prohibits a determination of the target control amount of the actuator based on the other one of the actual attitude-state quantity and the vehicle slip angle velocity, wherein
   the target control amount determination control unit makes the actuator control unit to determine the target control amount of the actuator based on the at least one of the actual attitude-state quantity and the vehicle slip angle velocity.

3. The vehicle motion control apparatus according to claim 2, further comprising:
   a priority degree selection unit which determines a priority degree between the target control amount of the actuator determined based on the vehicle slip angle velocity and the target control amount of the actuator determined based on the actual attitude-state quantity, wherein
   the actuator control unit determines the target control amount of the actuator based on the priority degree determined by the priority degree selection unit.

4. The vehicle motion control apparatus according to claim 3, further comprising:
   an estimation accuracy determination unit which estimates an accuracy degree of the actual attitude-state quantity, wherein
   the estimation accuracy determination unit increases the priority degree of the target control amount of the actuator determined based on the vehicle slip angle velocity such that the target control amount of the actuator determined based on the vehicle slip angle velocity is increased when the estimation accuracy determination unit determines that the accuracy degree of the actual attitude-state quantity is low.

5. The vehicle motion control apparatus according to claim 4, wherein the vehicle slip angle velocity calculation unit includes a vehicle body actual slip angle estimation accuracy determination unit which estimates an accuracy degree of a vehicle body actual slip angle in an actual attitude-state quantity, and changes an output value of the vehicle slip angle velocity based on the accuracy degree of the vehicle body actual slip angle determined by the vehicle body actual slip angle estimation accuracy determination unit.

6. The vehicle motion control apparatus according to claim 3, wherein the vehicle slip angle velocity calculation unit includes a vehicle body actual slip angle estimation accuracy determination unit which estimates an accuracy degree of a vehicle body actual slip angle in an actual attitude-state quantity, and changes an output value of the vehicle slip angle velocity based on the accuracy degree of the vehicle body actual slip angle determined by the vehicle body actual slip angle estimation accuracy determination unit.

7. The vehicle motion control apparatus according to claim 2, wherein the vehicle slip angle velocity calculation unit includes a vehicle body actual slip angle estimation accuracy determination unit which estimates an accuracy degree of a vehicle body actual slip angle in an actual attitude-state quantity, and changes an output value of the vehicle slip angle velocity based on the accuracy degree of the vehicle body actual slip angle determined by the vehicle body actual slip angle estimation accuracy determination unit.

8. The vehicle motion control apparatus according to claim 1, further comprising:
a priority degree selection unit which determines a priority degree between the target control amount of the actuator determined based on the vehicle slip angle velocity and the target control amount of the actuator determined based on the actual attitude-state quantity, wherein
the actuator control unit determines the target control amount of the actuator based on the priority degree determined by the priority degree selection unit.

9. The vehicle motion control apparatus according to claim 8, further comprising:
an estimation accuracy determination unit which estimates an accuracy degree of the actual attitude-state quantity, wherein
the estimation accuracy determination unit increases the priority degree of the target control amount of the actuator determined based on the vehicle slip angle velocity such that the target control amount of the actuator determined based on the vehicle slip angle velocity is increased when the estimation accuracy determination unit determines that the accuracy degree of the actual attitude-state quantity is low.

10. The vehicle motion control apparatus according to claim 9, wherein the vehicle slip angle velocity calculation unit includes a vehicle body actual slip angle estimation accuracy determination unit which estimates an accuracy degree of a vehicle body actual slip angle in an actual attitude-state quantity, and changes an output value of the vehicle slip angle velocity based on the accuracy degree of the vehicle body actual slip angle determined by the vehicle body actual slip angle estimation accuracy determination unit.

11. The vehicle motion control apparatus according to claim 8, wherein the vehicle slip angle velocity calculation unit includes a vehicle body actual slip angle estimation accuracy determination unit which estimates an accuracy degree of a vehicle body actual slip angle in an actual attitude-state quantity, and changes an output value of the vehicle slip angle velocity based on the accuracy degree of the vehicle body actual slip angle determined by the vehicle body actual slip angle estimation accuracy determination unit.

12. The vehicle motion control apparatus according to claim 1, wherein the vehicle slip angle velocity calculation unit includes a vehicle body actual slip angle estimation accuracy determination unit which estimates an accuracy degree of a vehicle body actual slip angle in an actual attitude-state quantity, and changes an output value of the vehicle slip angle velocity based on the accuracy degree of the vehicle body actual slip angle determined by the vehicle body actual slip angle estimation accuracy determination unit.

13. A vehicle motion control apparatus comprising:
an operated state detecting unit which detects an operated state quantity of a vehicle given by a driver;
a motion state detecting unit which detects a motion state quantity of the vehicle, the motion state detecting unit including at least a lateral acceleration sensor which detects a lateral acceleration and a yaw rate sensor which detects an actual yaw rate;
a reference attitude-state quantity calculation unit which calculates a reference attitude-state quantity corresponding to the operated state quantity of the vehicle and the motion state quantity of the vehicle based on a motion model of the vehicle which is a model for the vehicle under the condition in which an external force is applied to the vehicle;
an actual attitude state determining unit which determines an actual attitude-state quantity of the vehicle based on detection signals of the operated state detecting unit and the motion state detecting unit;
an attitude-state quantity difference calculation unit which calculates a difference between the reference attitude-state quantity of the vehicle and the actual attitude-state quantity of the vehicle;
a virtual external force calculation unit which corrects the external force based on the difference calculated in the attitude-state quantity difference calculation unit and feedbacks the corrected external force to the reference attitude-state quantity calculation unit;
an actuator control unit which determines a target control amount of an actuator which generates a vehicle motion;
a vehicle slip angle velocity calculation unit which calculates a vehicle slip angle velocity based on the lateral acceleration and the actual yaw rate;
a first control target yaw moment calculation unit which determines a first control target yaw moment based on the actual attitude-state quantity of the vehicle;
a second control target yaw moment calculation unit which determines a second control target yaw moment based on the vehicle slip angle velocity; wherein
a higher value selection unit which compares the first control target yaw moment with the second control target yaw moment and selects a higher value of the first control target yaw moment and the second control target yaw moment, and outputs the selected value to the actuator control unit; and
the actuator control unit determines the control target amount of the actuator based on the higher value of the first and the second control target yaw moments selected by the higher value selection unit.

14. The vehicle motion control apparatus according to claim 13, further comprising: a restriction unit which restricts the determined first and the second control target yaw moment when the vehicle slip angle velocity calculated by the vehicle slip angle velocity calculation unit or the actual attitude-state quantity of the vehicle determined by the actual attitude state determining unit is less than or equal to a predetermined value, and outputs the restricted first and the second control target yaw moment to the actuator control unit.

15. The vehicle motion control apparatus according to claim 14, wherein the vehicle slip angle velocity calculation unit includes a vehicle body actual slip angle estimation accuracy determination unit which estimates an accuracy degree of a vehicle body actual slip angle in an actual attitude-state quantity, and changes an output value of the vehicle slip angle velocity based on the accuracy degree of the vehicle body actual slip angle determined by the vehicle body actual slip angle estimation accuracy determination unit.

16. The vehicle motion control apparatus according to claim 13, wherein the vehicle slip angle velocity calculation unit includes a vehicle body actual slip angle estimation accuracy determination unit which estimates an accuracy degree of a vehicle body actual slip angle in an actual attitude-state quantity, and changes an output value of the vehicle slip angle velocity based on the accuracy degree of the vehicle body actual slip angle determined by the vehicle body actual slip angle estimation accuracy determination unit.

* * * * *